United States Patent
Nakano et al.

(10) Patent No.: US 10,116,042 B2
(45) Date of Patent: Oct. 30, 2018

(54) ANTENNA DEVICE AND COMMUNICATION TERMINAL DEVICE

(71) Applicant: Murata Manufacturing Co., Ltd., Nagaokakyo-shi, Kyoto-fu (JP)

(72) Inventors: Shinichi Nakano, Nagaokakyo (JP); Kuniaki Yosui, Nagaokakyo (JP); Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/843,093

(22) Filed: Dec. 15, 2017

(65) Prior Publication Data
US 2018/0108976 A1    Apr. 19, 2018

Related U.S. Application Data

(63) Continuation of application No. 14/749,879, filed on Jun. 25, 2015, now Pat. No. 9,882,267, which is a (Continued)

(30) Foreign Application Priority Data

Jun. 28, 2012 (JP) .................. 2012-144968
Sep. 14, 2012 (JP) .................. 2012-202755

(51) Int. Cl.
*H01Q 1/24* (2006.01)
*H01Q 1/48* (2006.01)
(Continued)

(52) U.S. Cl.
CPC ....... *H01Q 1/243* (2013.01); *G06K 19/07794* (2013.01); *H01Q 1/48* (2013.01);
(Continued)

(58) Field of Classification Search
CPC .......... H01Q 1/241–1/243; H01Q 1/48; H01Q 7/00; H01Q 9/04
(Continued)

(56) References Cited

U.S. PATENT DOCUMENTS 7,151,492 B2 * 12/2006 Iguchi .................... H01Q 1/243
343/700 MS
2003/0098813 A1 * 5/2003 Koskiniemi ......... H01Q 9/0421
343/702

(Continued)

OTHER PUBLICATIONS

Nakano et al., "Antenna Device and Communication Terminal Device", U.S. Appl. No. 14/749,879, filed Jun. 25, 2015.

*Primary Examiner* — Dameon E Levi
*Assistant Examiner* — Hasan Islam
(74) *Attorney, Agent, or Firm* — Keating & Bennett, LLP

(57) ABSTRACT

An antenna device includes a first conductor plane and a second conductor plane that face each other. The first conductor plane and the second conductor plane are electrically continuous through a first connection conductor, a second connection conductor, and a chip capacitor. A power feed coil is disposed between the first conductor plane and the second conductor plane. The power feed coil includes a magnetic core and a coil conductor. The coil conductor defines a pattern such that the coil conductor winds around the magnetic core. The power feed coil is disposed at a position closer to the first connection conductor and magnetically couples with the first connection conductor.

4 Claims, 30 Drawing Sheets

Related U.S. Application Data continuation of application No. 14/219,172, filed on Mar. 19, 2014, now Pat. No. 9,748,634, which is a continuation of application No. PCT/JP2013/067804, filed on Jun. 28, 2013.

(51) Int. Cl.
*H01Q 7/00* (2006.01)
*H01Q 9/04* (2006.01)
*G06K 19/077* (2006.01)
*H01Q 1/52* (2006.01)

(52) U.S. Cl.
CPC ............... *H01Q 1/521* (2013.01); *H01Q 7/00* (2013.01); *H01Q 9/045* (2013.01); *H01Q 9/0407* (2013.01)

(58) Field of Classification Search
USPC .................. 343/702, 700 MS, 788, 866, 867
See application file for complete search history.

(56) References Cited

U.S. PATENT DOCUMENTS

2009/0009415 A1\* 1/2009 Tanska ............... G06K 7/10336
343/742
2012/0299785 A1\* 11/2012 Bevelacqua ............. H01Q 9/42
343/702

\* cited by examiner

ANTENNA DEVICE AND COMMUNICATION TERMINAL DEVICE

BACKGROUND OF THE INVENTION

1. Field of the Invention

The present invention relates to antenna devices and communication terminal devices for use in HF band or UHF band telecommunication systems.

2. Description of the Related Art

Typically, in a 13.56 MHz band RFID system such as near field communication (NFC) and the like implemented in cellular phone terminals, a RFID IC chip and matching elements are mostly mounted on a printed wiring board, an antenna is pasted on an inner side surface of a terminal casing, and the IC chip is electrically (galvanically) connected to the antenna with a spring pin or the like.

On the other hand, recent radio communication terminals such as cellular phone terminals are made thinner, and in more cases, the terminal casing is "metalized" by performing, for example, magnesium plating processing on the terminal casing to compensate insufficient strength due to the thinner structure.

However, when the terminal casing is "metalized", the metal shields off an electromagnetic field around the antenna incorporated within the terminal. This creates a problem such that communication with a counterpart antenna becomes difficult to perform.

In view of the above, Japanese Unexamined Patent Application Publication No. 2011-97657 proposes an antenna device configured such that a metal plate having a larger area than an antenna coil is disposed in proximity (magnetic coupling) with the antenna coil and utilized as a radiator.

The antenna configuration described in Japanese Unexamined Patent Application Publication No. 2011-97657 enables communication with a counterpart antenna even when the antenna is shielded by the metal. However, it is necessary to consider a decrease in mechanical strength due to formation of a slit or opening portion in the metal plate. This costs more man-hours in production. Particularly, when a slit or opening is formed in a metal casing, there may be an additional constraint on casing design. Further, since a portion close to the slit or opening portion may not be connected to a circuit ground, a partial electric potential variation may occur at the metal plate. This creates a problem such that an electric field shielding effect by the metal plate may be weakened, or a concern such that a first conductor plane and a second conductor plane may interfere with another high frequency circuit.

SUMMARY OF THE INVENTION

Preferred embodiments of the present invention provide an antenna device that eliminates the problems of decreased mechanical strength, design restrictions, and decreased electric field shielding effect, and also reduces or eliminates problems such as interference with another high frequency circuit or the like if the need arises, without including a slit or opening in the metal plate while allowing the same metal plate (conductor plane) to be used as a radiator element. Other preferred embodiments of the present invention provide a communication terminal device including such an antenna device.

An antenna device according to a preferred embodiment of the present invention includes a connection conductor that connects a plurality of conductive members; a capacitor that defines a looped current path with the conductive members and the connection conductor, and defines a resonant circuit with inductance components of the conductive members and the connection conductor; and a power feed coil that electromagnetically couples with the connection conductor.

According to the foregoing configuration, the power feed coil couples with the connection conductor, and a gap between the conductive members serves as an opening. Thus, the conductive members may be used as a radiator element without providing a slit or opening at a conductor plane. Further, the resonating operation improves power transmission efficiency between the power feed coil and the radiator element including the conductive members.

It is preferable that a resonant frequency of the resonant circuit is in a carrier frequency band of communication signals or near the carrier frequency band. The foregoing configuration improves radiation efficiency of the radiator element including the conductive members.

It is preferable that the conductive members include a conductor portion of a casing of the electronic equipment. The foregoing configuration makes it possible to use the conductor portion of a casing also as a portion of the radiator element.

It is preferable that the conductive members include a ground conductor provided on a circuit board. The foregoing configuration makes it possible to use the ground conductor of a circuit board also as a portion of the radiator element.

It is preferable that the conductive members include a plurality of conductive members that are arranged in a plane direction. The foregoing configuration achieves a larger looped current path and improves the radiation efficiency.

It is preferable that the conductive members include a metal member (battery pack, a liquid crystal display, etc.) disposed inside a casing of the electronic equipment. The foregoing configuration provides an antenna device without the need to provide a separate dedicated metal member for the radiator element.

It is preferable that the conductive members include a ground conductor located on a circuit board and a conductor portion of a casing of the electronic equipment, and the connection conductor is a ground connection pin connecting the ground conductor and the conductor portion of a casing. The foregoing configuration makes it possible to use the ground connection pin also as the connection conductor.

It is preferable that the conductive members include a first conductor plane and a second conductor plane that face each other, and the connection conductor includes a first connection conductor directly connecting the first conductor plane and the second conductor plane, and a second connection conductor connecting the first conductor plane and the second conductor plane through the capacitor.

It is preferable that the plurality of conductive members is circuit boards, and the connection conductor is a connector connecting the circuit boards.

It is preferable that the capacitor is mounted on a circuit board, and the connection conductor is the capacitor.

It is preferable that the power feed coil is mounted on a circuit board. This facilitates arrangement of the power feed coil.

The power feed coil may be a multilayer structure in which a plurality of insulator layers, on which conductors defining an inductor are provided, and a plurality of insulator layers, on which conductors defining the capacitor are provided, are stacked. This configuration does not require a capacitor element. Thus, it becomes possible to provide a built-in capacitance without increasing an antenna size and achieve space-saving on a circuit board.

The power feed coil and at least a portion of the connection conductor may be integrated into a single component. The foregoing configuration makes it possible to arrange the power feed coil without considering its spatial relationship with the conductive members, thus increasing flexibility in designing.

It is preferable that the connection conductor has a coil shape to magnetically couple with the power feed coil.

It is preferable that the capacitor is incorporated in the single component.

It is preferable that a RFIC is incorporated in the single component, and the RFIC is connected to the power feed coil.

It is preferable that the carrier frequency of communication signals is a HF band frequency, and the capacitor is an element that becomes inductive at a frequency equal to or above a UHF band. When an UHF band antenna is incorporated within the same casing, the foregoing configuration enables the power feed coil to be affected less by a board current due to the UHF band antenna, thus making it possible to achieve predetermined antenna characteristics.

A communication terminal device according to another preferred embodiment of the present invention includes an antenna device, a power feed circuit connected to the antenna device, a plurality of conductive members, a connection conductor that connects the plurality of conductive members, wherein the antenna device includes a capacitor that defines a looped current path with the conductive members and the connection conductor and that defines a resonant circuit with inductance components of the conductive members and the connection conductor, and a power feed coil that magnetically couples with the connection conductor.

According to various preferred embodiments of the present invention, the problems of decreased mechanical strength, design restrictions, and decreased electric field shielding effect are eliminated or avoided since the conductive members are used as a radiator element without providing a slit or opening in a conductor plane of the conductive member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
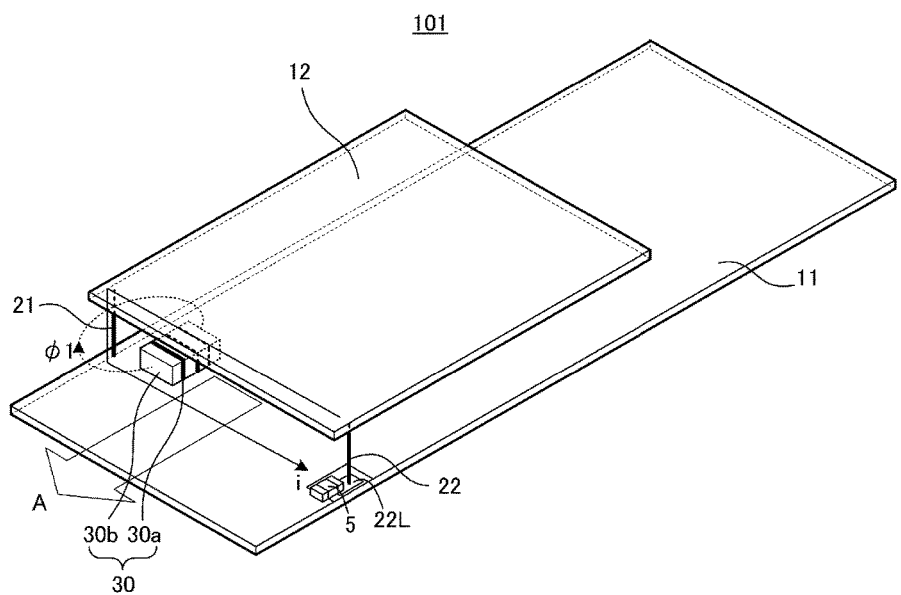
FIG. 1A is a perspective view of an antenna device 101 according to a first preferred embodiment of the present invention.

A plurality of preferred embodiments for implementing the present invention is described hereinafter using some specific examples with reference to the drawings. Like reference numerals denote like elements in the drawings. Each preferred embodiment is for illustrative purposes only, and constituting elements of different preferred embodiments may be combined or partially exchanged.

Figure 1B:
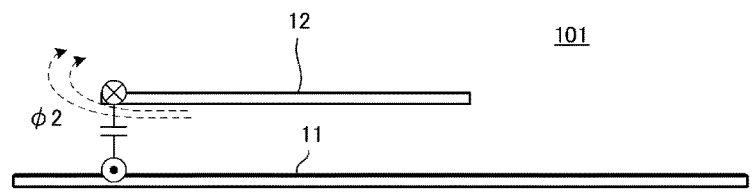
FIG. 1B is a side view of the antenna device 101.

The following antenna device of each preferred embodiment is preferably disposed in a communication terminal, which may be typified by a smartphone or a tablet terminal, which transmits and receives HF band (13.56 MHz band or the like) high frequency signals, for example.
First Preferred Embodiment FIG. 1A is a perspective view of an antenna device 101 according to the first preferred embodiment, and FIG. 1B is a side view of the antenna device 101. The antenna device 101 preferably is an antenna that may be used in HF bands such as, for example, 13.56 MHz and the like, and have proximity type or vicinity type magnetic field coupling with a counterpart antenna.

The antenna device 101 includes a first conductor plane 11 and a second conductor plane 12 that face each other. The first conductor plane 11 and the second conductor plane 12 that are facing each other are conductive members originally equipped in a communication terminal, and are not prepared for the antenna for use in a HF band communication system. Further, the antenna device 101 includes a first connection conductor 21 and a second connection conductor 22. A power feed coil 30 is disposed between the first conductor plane 11 and the second conductor plane 12. This power feed coil 30 is disposed at a position closer to the first connection conductor 21. The power feed coil 30 preferably includes a magnetic core 30b and a coil conductor 30a. The coil conductor 30a defines a pattern such that the coil conductor 30a winds around the magnetic core 30b.

The first conductor plane 11 may be, for example, a ground conductor pattern of a circuit board and, for example, made of copper. The second conductor plane 12 may be, for example, a metal portion of a casing and, for example, made of aluminum, magnesium, carbon, etc. In this way, a "plurality of conductive members" is conductive members that are originally included in a communication terminal. The first connection conductor 21 is a pin terminal and provides a direct electrical connection between the first conductor plane 11 and the second conductor plane 12. The second connection conductor 22 is mounted on a land 22L, and connects the land 22L and the second conductor plane 12. The pin terminal preferably is formed by gold plating a core material such as a copper or the like, for example. A chip capacitor 5 is mounted between the land 22L and the first conductor plane 11. According to this structure, the first conductor plane 11 and the second conductor plane 12 are connected to each other through the chip capacitor 5. In other words, two conductive members, two connection conductors, and the chip capacitor define a looped current path. This current path corresponds to a "looped current path".

As illustrated in FIG. 1A, in the foregoing looped electrode path, a maximum voltage is obtained near the second connection conductor 22 for an open end is provided therein whereas a maximum current is obtained at the first connection conductor 21. In other words, it serves as a half-wavelength antenna. A current i illustrated in FIG. 1A represents a current flowing from one side of the open end to the other side of the open end through the first conductor plane 11 and the second conductor plane 12. A magnetic flux φ1 illustrated in FIG. 1A represents a magnetic flux that goes through the power feed coil 30 and interlinks with the first connection conductor 21. In this way, the magnetic field coupling between the power feed coil 30 and the first connection conductor 21 induces a current in the first connection conductor 21. The induced current flows efficiently by disposing the power feed coil 30 near the first connection conductor 21 where the maximum current is obtained in the foregoing looped electrode path. Accordingly, it is preferable that the power feed coil 30 is disposed near the first connection conductor 21.

A LC resonant circuit preferably includes a capacitance of the chip capacitor 5 connected to the second connection conductor 22 and inductance components of the first conductor plane 11, the first connection conductor 21, the second connection conductor 22, and the second conductor plane 12. The resonant frequency of this LC resonant circuit corresponds to a carrier frequency of communication signals. In other words, the capacitance of the chip capacitor 5 connected to the second connection conductor 22 is determined so that the LC circuit resonates at a frequency in a carrier frequency band of communication signals or in the vicinity of the carrier frequency band.

As illustrated in FIG. 1B, the current flows in the first conductor plane 11 and the second conductor plane 12 causes coming in and going out of a magnetic flux φ2 at an opening between the first conductor plane 11 and the second conductor plane 12. The path of the current flowing in the first conductor plane 11 and the second conductor plane 12 is fixed by the position of the second connection conductor 22. This allows focusing of the current flow especially near edge portions of the second conductor plane 12 and the first conductor plane 11.

In this way, the current flow especially near edge portions of the second conductor plane 12 and the first conductor plane 11 allows the opening located between the first conductor plane 11 and the second conductor plane 12 to define and serve as a radiation portion. Accordingly, the antenna device 101 has directivity in an arrow direction A illustrated in FIG. 1A.

Figure 2:
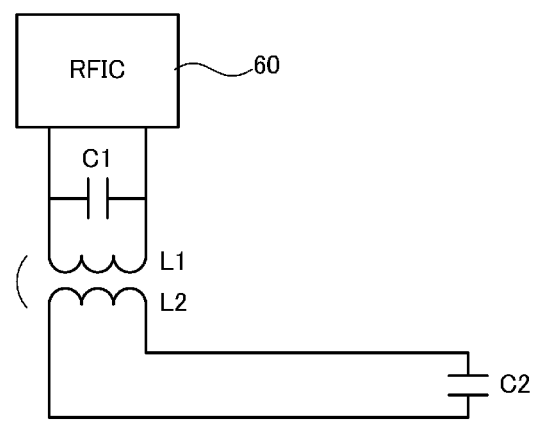
FIG. 2 is an equivalent circuit diagram of the antenna device 101 illustrated with a power feed circuit.

FIG. 2 is an equivalent circuit diagram of the antenna device 101 illustrated with a power feed circuit. In FIG. 2, an inductor L1 corresponds to the power feed coil 30, and a capacitor C1 corresponds to a capacitance due to the power feed coil 30 and a RFIC 60. These L1 and C1 define a resonant circuit on a power feed coil side. An inductor L2 corresponds to an inductance of the first conductor plane 11, the first connection conductor 21, and the second conductor plane 12. A capacitor C2 corresponds to a capacitor connected to the second connection conductor 22. These elements L2 and C2 define a resonant circuit on a radiator element side. The coupling between the power feed coil side resonant circuit and the radiator element side resonant circuit is improved as well as the radiation efficiency by matching resonant frequencies of these two resonant circuits to a frequency band of communication frequencies (carrier frequencies).

Further, there is no need to form or provide a slit or opening portion in a metal casing, or to avoid formation of ground connection near the slit or opening portion. Thus, no partial electrical potential variation occurs in the metal casing (conductor plane of conductive member). Accordingly, there is no the problem of weaker electric field shielding effect due to the conductive member.

In this way, preferable communication characteristics may be obtained even when top and bottom surfaces of the power feed coil 30 are covered with metal.

In the HF band, the capacitance value of the second connection conductor 22 serves as a capacitor of a predetermined capacitance. This capacitance value is not limited to any particular value. However, when the capacitance value is equal to or higher than a predetermined value, it becomes inductive at a frequency higher than the frequency utilized in the antenna device 101 such as a UHF band or the like, for example. Thus, for example, in a UHF band, a connection portion of the second connection conductor 22 may have an impedance as low as the first connection conductor 21. Accordingly, even when a UHF band antenna is disposed in the vicinity, in the eyes of the UHF band antenna, the first conductor plane 11 and the second conductor plane 12 are connected to each other through the first connection conductor 21 and the second connection conductor 22, for each of which serves as a short pin (ground connection pin). As a result, for the UHF band antenna, the whole of the first conductor plane 11 and the second conductor plane 12 defines and serves as ground in which the electric potential is stable. In other words, since the second connection conductor 22 is galvanically isolated, there is no undesirable effect on UHF band antenna characteristics.

In the example illustrated in FIG. 1A, the pin terminal is preferably used as the first connection conductor 21. Alternatively, a narrow width metal plate or the like may be used to short-circuit the first conductor plane 11 and the second conductor plane 12 by using its portion that is somewhat expanded linearly. Further, in the example illustrated in FIG. 1A and FIG. 1B, a stray capacitance produced between the first conductor plane 11 and the second conductor plane 12 may also be used.

Second Preferred Embodiment

Figure 3:
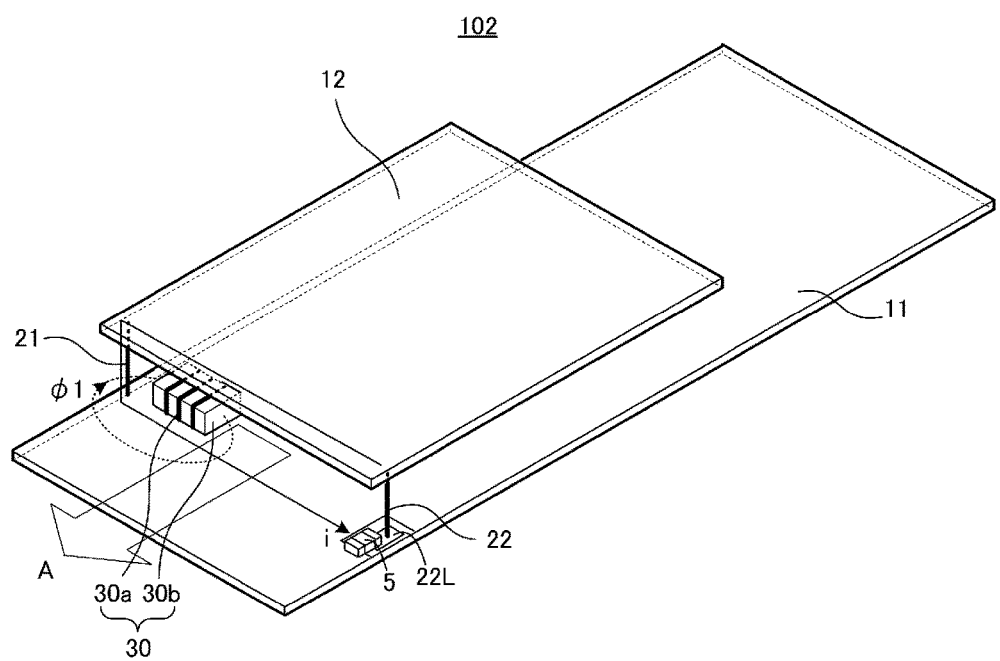
FIG. 3 is a perspective view of an antenna device 102 according to a second preferred embodiment of the present invention.

FIG. 3 is a perspective view of an antenna device 102 according to the second preferred embodiment of the present invention. A difference from the antenna device 101 illustrated in FIG. 1 in the first preferred embodiment is in the spatial relationship of a power feed coil 30 relative to a first connection conductor 21. In the example illustrated in FIG. 1, the power feed coil 30 is arranged so that a coil winding axis is perpendicular or substantially perpendicular to an opening plane located between the first conductor plane 11 and one side of the second conductor plane 12. On the other hand, in the antenna device 102 of FIG. 3, the power feed coil 30 is arranged so that the coil winding axis is parallel or substantially parallel to the opening plane located between the first conductor plane 11 and one side of the second conductor plane 12. However, the feature that the power feed coil 30 is magnetically coupled with the first connection conductor 21 is preferably the same as in the first preferred embodiment. A magnetic flux $\phi 1$ illustrated in FIG. 3 represents a magnetic flux that goes through the power feed coil 30 and interlinks with the first connection conductor 21. In such an arrangement, it is still possible to magnetically couple the power feed coil 30 and the first connection conductor 21. Other functions are similar to those of the first preferred embodiment.

In this way, the directivity of the coil winding axis of the power feed coil 30 may not be limited to the cases in FIG. 1A and FIG. 3, and may be arranged in any direction as long as the power feed coil 30 couples with the first connection conductor 21.

Third Preferred Embodiment

Figure 4A:
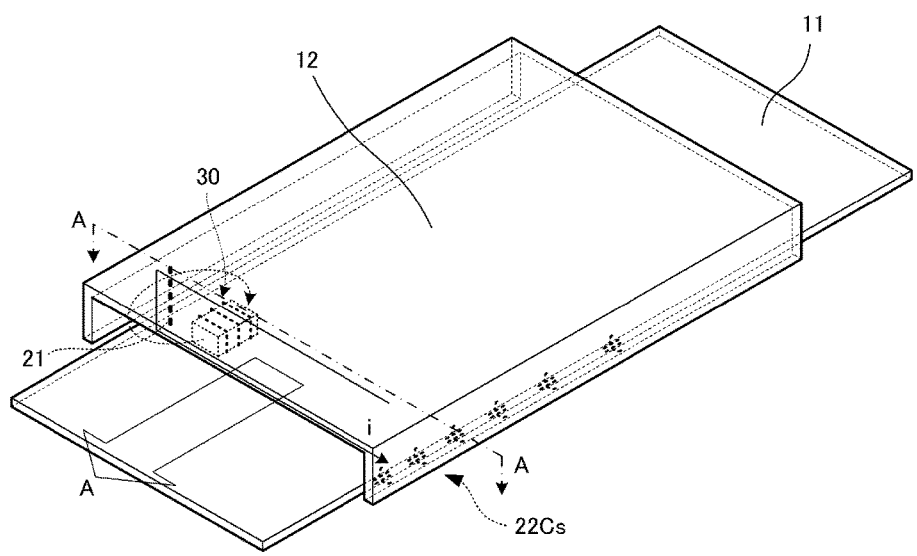
FIG. 4A is a perspective view of an antenna device 103 according to a third preferred embodiment of the present invention.
Figure 4B:
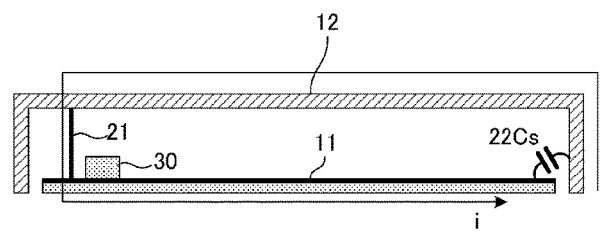
FIG. 4B is an A-A cross-section view of FIG. 4A.

FIG. 4A is a perspective view of an antenna device 103 according to the third preferred embodiment of the present invention, and FIG. 4B is an A-A cross-section view of FIG. 4A. The antenna device 103 includes a first conductor plane 11 and a second conductor plane 12 that face each other. A first connection conductor 21 connects the first conductor plane 11 and the second conductor plane 12. A power feed coil 30 is disposed between the first conductor plane 11 and the second conductor plane 12. The first conductor plane 11 may be, for example, a ground conductor pattern of a circuit board. The second conductor plane 12 may be, for example, a metal portion of a casing. The second conductor plane 12 may be, for example, a metal portion configured so as to extend across the range from a flat surface to both side surfaces of the casing. In this example, the first connection conductor 21 is located at a position little behind an opening plane located between an edge side of the second conductor plane 12 and the first conductor plane 11. There is a stray capacitance 22Cs between the first conductor plane 11 and both side surface portions of the second conductor plane 12.

The structure illustrated in FIG. 4 also allows the power feed coil 30 to couple with the first connection conductor 21, and a current i is induced in the first conductor plane 11 and the second conductor plane 12. Further, the opening plane located between the edge side of the second conductor plane 12 and the first conductor plane 11 defines and serves as a radiation plane, and the antenna device 103 has a directivity in the arrow direction A.

In this way, the first conductor plane 11 and the second conductor plane 12 do not need to be simple planes as long as they have surfaces facing each other.

Fourth Preferred Embodiment

Figure 5A:
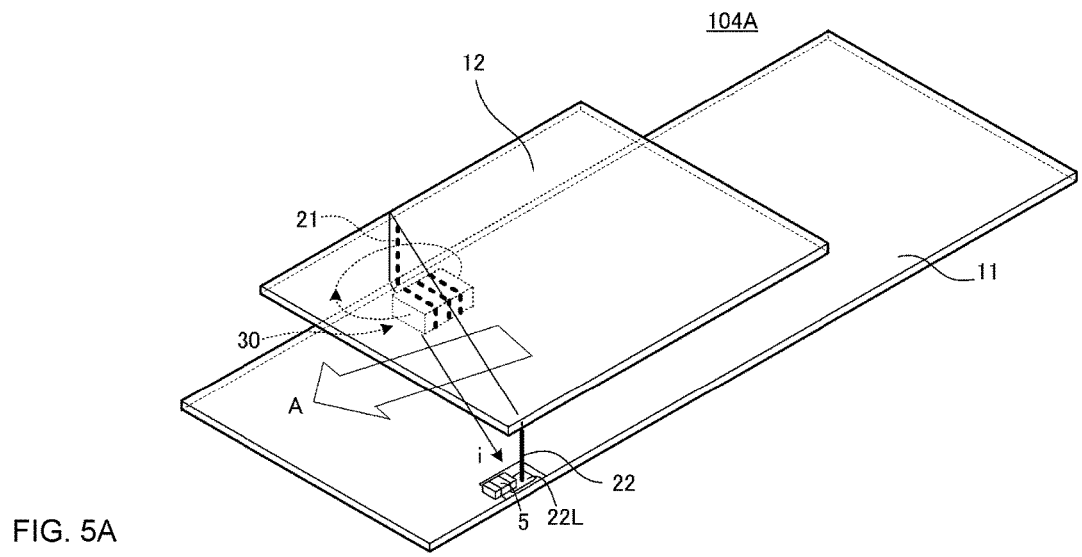
FIG. 5A is a perspective view of an antenna device 104A according to a fourth preferred embodiment of the present invention.
Figure 5B:
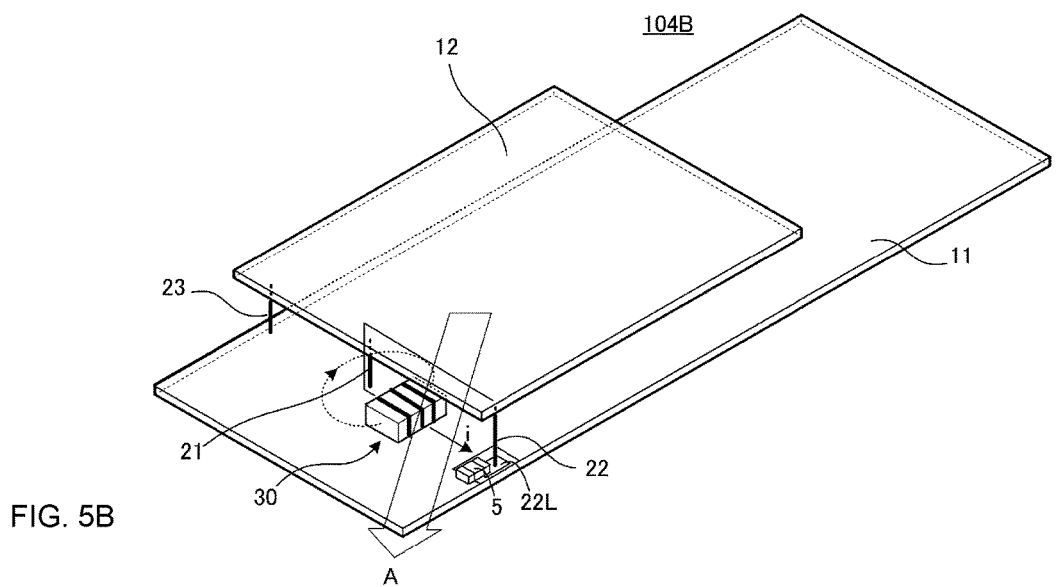
FIG. 5B is a perspective view of another antenna device 104B according to the fourth preferred embodiment of the present invention.

FIG. 5A is a perspective view of an antenna device 104A according to the fourth preferred embodiment of the present invention, and FIG. 5B is a perspective view of another antenna device 104B according to the fourth preferred embodiment.

As illustrated in FIG. 5A, a first connection conductor 21 is disposed at a position that is shifted from a corner portion of a second conductor plane 12 in a longer direction of a first conductor plane 11. A power feed coil 30 is disposed near the first connection conductor 21. The remaining structure is similar to the one illustrated in FIG. 1A.

The antenna device 104A is configured to have an equivalent square opening defined by the first connection conductor 21 and a second connection conductor 22, which define two opposing sides of the square opening, and portions of the first conductor plane 11 and the second conductor plane 12, which defines two remaining sides of the square opening. A current i flows along this opening. Accordingly, the antenna device 104A includes the foregoing opening that serves as a radiation plane, and has directivity in the arrow direction A.

Similarly, the foregoing equivalent opening may be modified by changing the position of the second connection conductor 22. Thus, the directivity may be determined by the positions of the first connection conductor 21 and the second connection conductor 22.

As illustrated in FIG. 5B, the first connection conductor 21 is disposed at a position that is shifted from a corner portion of the second conductor plane 12 in a shorter direction of the first conductor plane 11. The power feed coil 30 is disposed near the first connection conductor 21. A corner portion of the second conductor plane 12 is connected to the first conductor plane 11 with a pin terminal 23. The remaining structure is similar to the one illustrated in FIG. 1A.

In this way, the directivity may be set in the arrow A direction that inclines to a corner direction by disposing the opening portion (two sides of which are the first connection conductor 21 and the second connection conductor 22), which is sandwiched between the first connection conductor 21 and the second connection conductor 22, at a position closer to a corner portion of an opposing region of the first conductor plane 11 and the second conductor plane 12. When the structure of FIG. 5B is used, it is not necessarily required to mount the power feed coil 30 near the end portion of the first conductor portion. This increases flexibility in determining the mounting position of the power feed coil.

Fifth Preferred Embodiment

Figure 6:
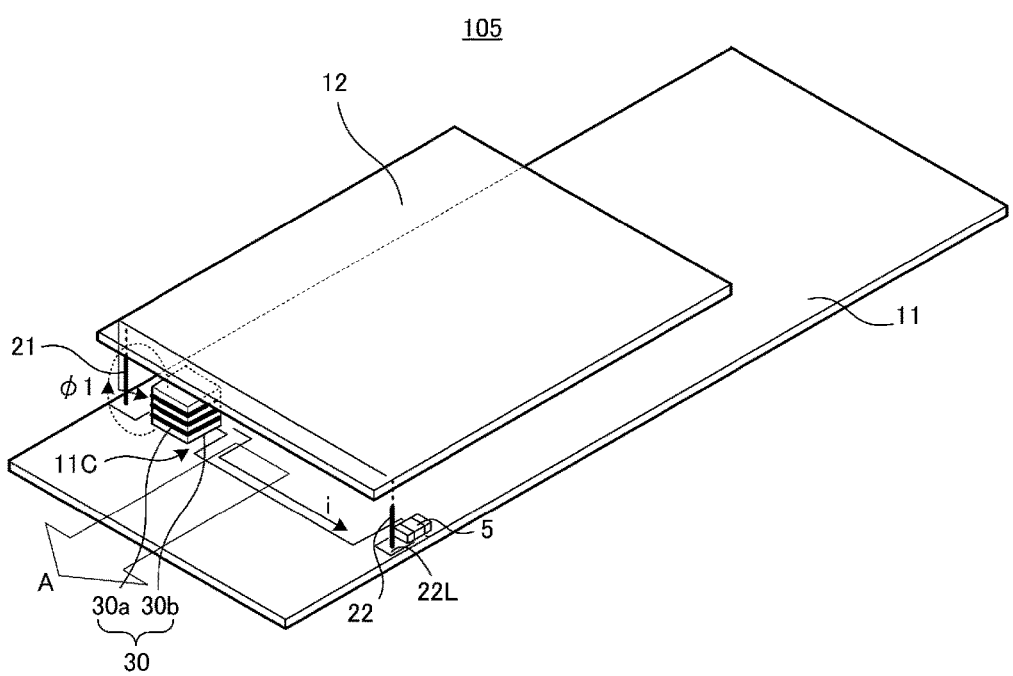
FIG. 6 is a perspective view of an antenna device 105 according to a fifth preferred embodiment of the present invention.

FIG. 6 is a perspective view of an antenna device 105 according to the fifth preferred embodiment of the present invention. This example differs from the antenna device 101 illustrated in FIG. 1 in that a power feed coil 30 is disposed so that a coil winding axis is perpendicular or substantially perpendicular to a first conductor plane 11. A magnetic flux φ1 illustrated in FIG. 6 represents a magnetic flux that goes through the power feed coil 30 and interlinks with a first connection conductor 21. This magnetic field coupling between the power feed coil 30 and the first connection conductor 21 induces a current in the first connection conductor 21, and this current i flows in the first conductor plane 11 and a second conductor plane 12. Other functions are similar to those of the first preferred embodiment.

In the example illustrated in FIG. 6, a cutout 11C is provided near an end portion of the first conductor plane 11, and the power feed coil 30 is disposed so that at least a portion of a coil opening portion of the power feed coil 30 overlaps with the cutout 11C. This allows a magnetic flux φ1 to pass through the cutout 11C (makes it difficult to block with the first conductor plane 11), and facilitates the interlinkage with the first connection conductor 21.

In the present preferred embodiment, the power feed coil 30 may also be disposed at a position such that at least a portion of a coil opening portion of the power feed coil 30 protrudes beyond an edge of the first conductor plane 11 when viewed from the first conductor plane 11 side. This structure also makes it difficult to block the magnetic flux φ1 with the first conductor plane 11, and facilitates the interlinkage with the first connection conductor 21.

Alternatively, the power feed coil 30 may be disposed closer to the first connection conductor 21. The magnetic coupling may be made stronger by placing the power feed coil 30 closer to the first connection conductor 21. Further, the power feed coil 30 may be configured to include a non-coiled portion, in which no coil is wound, near a lower portion thereof. In this case, the magnetic flux φ1 passes through the non-coiled portion without being blocked by the first conductor plane 11, facilitating the interlinkage with the first connection conductor 21. Further, the provision of the non-coiled portion may ease constraints in mounting the power feed coil 30 such as the foregoing formation of the cutout in the first conductor plane 11 or the like. Particularly, when the non-coiled portion is provided with a magnetic layer, the magnetic flux passes more freely. Thus, the non-coiled portion may be made smaller.

Sixth Preferred Embodiment

In the sixth preferred embodiment of the present invention, a coupling portion is included inside a power feed coil to magnetically connect with a first connection conductor 21. This enables the power feed coil to be placed at any location without considering a spatial relationship with the first connection conductor 21.

Figure 7A:
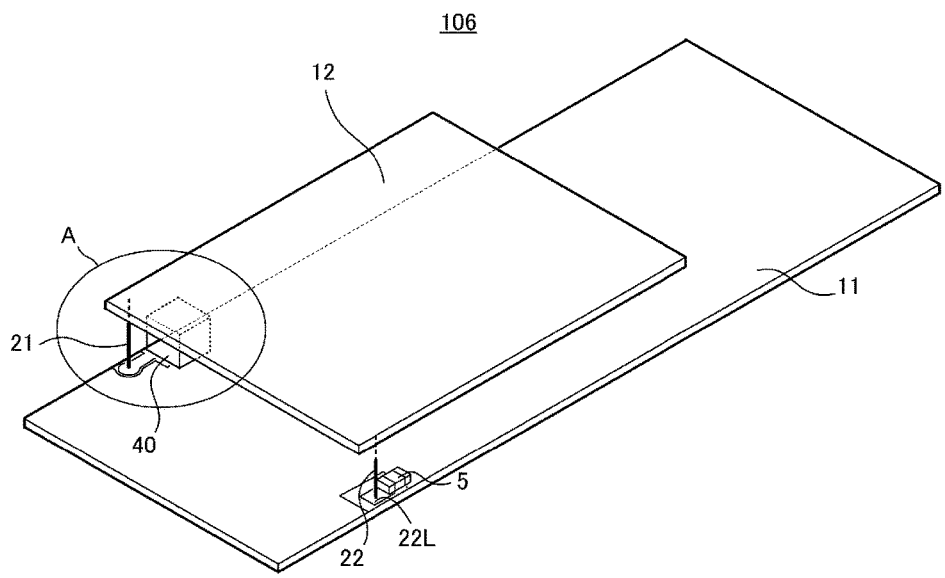
FIG. 7A is a perspective view of an antenna device 106 according to a sixth preferred embodiment of the present invention.
Figure 7B:
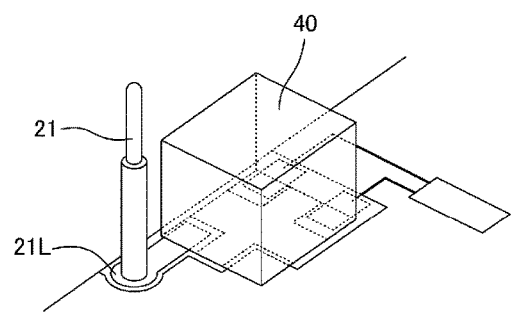
FIG. 7B is an enlarged perspective view of a portion A illustrated in FIG. 7A.

FIG. 7A is a perspective view of an antenna device 106 according to the sixth preferred embodiment, and FIG. 7B is an enlarged perspective view of a portion A illustrated in FIG. 7A.

Figure 8:
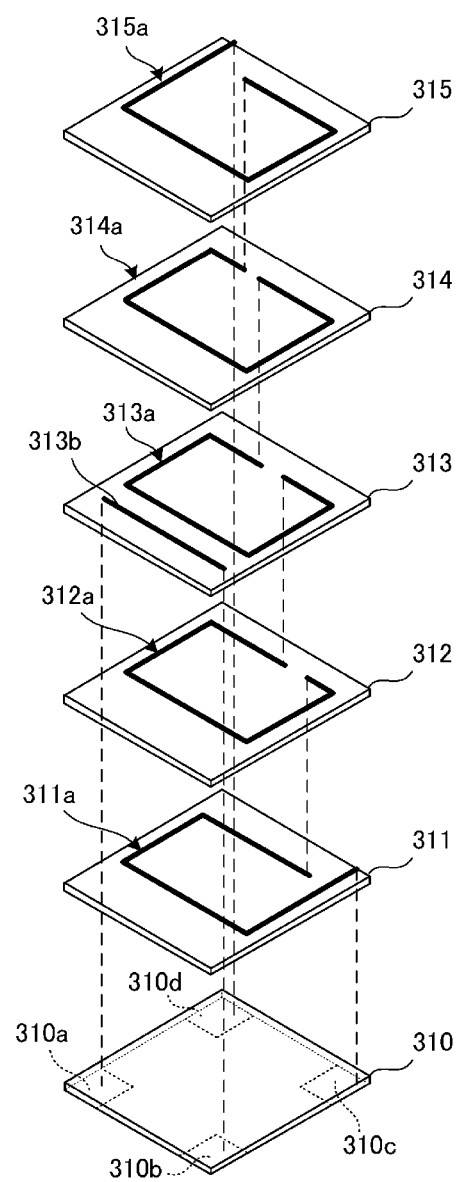
FIG. 8 is an exploded perspective view of a module 40 according to the sixth preferred embodiment of the present invention, in which a power feed coil and a connection conductor are integrated.

FIG. 8 is an exploded perspective view of a module 40 according to the sixth preferred embodiment in which the power feed coil and the connection conductor are integrated. The module 40 preferably has a multilayer structure including a plurality of magnetic layers. FIG. 8 illustrates a portion of the plurality of magnetic layers included in the module 40. Coil conductor patterns 311a, 312a, 313a, 314a, and 315a, each of which define a portion of a coil pattern, are provided on magnetic layers 311, 312, 313, 314, and 315, respectively.

The coil conductor patterns 311a, 312a, 313a, 314a, and 315a each have a loop shape, are connected with via-conductors to provide electrical continuity therebetween, and define a single coil. Further, a linear coupling conductor pattern 313b is provided on the magnetic layer 313. The coupling conductor pattern 313b is preferably located near the coil conductor pattern 313a.

A non-magnetic layer 310, on which input-output terminals 310a, 310b, 310c, and 310d are provided, is stacked below the magnetic layer 311. The input-output terminals 310a and 310b are connected to the coupling conductor pattern 313b with via-conductors. The input-output terminal 310c is connected to one end of the coil conductor pattern 311a, and the input-output terminal 310d is connected to one end of the coil conductor pattern 315a. In other words, the input-output terminals 310c and 310d are input-output terminals of the coil formed of the coil conductor patterns 311a to 315a. Here, the magnetic layers 311, 312, 313, 314, and 315 may not necessarily to be magnetic layers. Alternatively, they may be dielectric layers, or define a structure in which magnetic layers and non-magnetic layers are stacked in an alternating fashion, or be arbitrarily determined depending on needs (the same applies to the following preferred embodiments).

Figure 9:
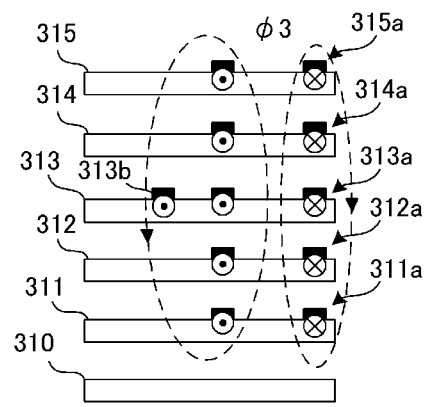
FIG. 9 is an exploded cross-section view of the module 40 in which a power feed coil and a connection conductor are integrated.

FIG. 9 is an exploded cross-section view of the module 40 in which the power feed coil and the connection conductor are integrated. A magnetic flux $\phi 3$ illustrated in FIG. 9 represents a magnetic flux produced by a current flowing through the coil defined the coil conductor patterns 311a to 315a. This magnetic flux $\phi 3$ induces a current in the coupling conductor pattern 313b. Accordingly, the coil and the coupling conductor pattern 313b are magnetically coupled together inside the module 40. As described above, the coupling conductor pattern 313b and the first connection conductor 21 are electrically continuous. As a result, the power feed coil in the module 40 is magnetically coupled with the first connection conductor 21.

Figure 10:
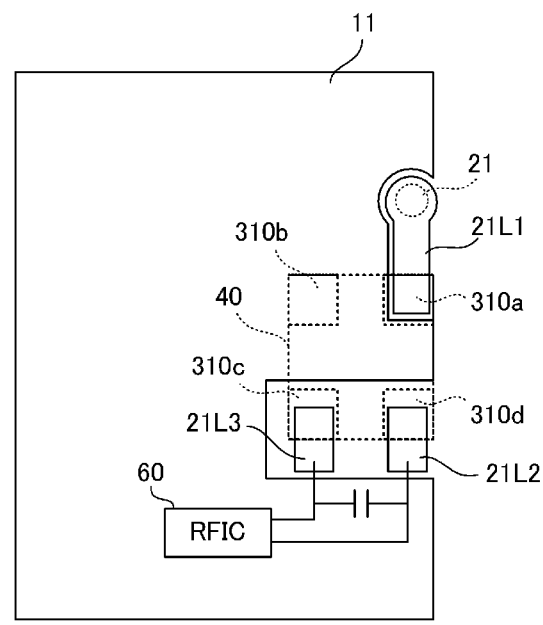
FIG. 10 is a partial view of a circuit board on which the module 40, in which a power feed coil and a connection conductor are integrated, is mounted.

FIG. 10 is a partial view of a circuit board on which the module 40, in which the power supply coil and the connection conductor are integrated, is mounted. A first conductor plane 11 that serves as, for example, a ground conductor pattern may be provided on the circuit board. Further, on the circuit board, lands 21L1, 21L2, and 21L3, which are not electrically continuous with the first conductor plane 11, are provided. The module 40 is mounted in such a way that the input-output terminal 310a is connected to the land 21L1, the input-output terminal 310b is connected to the first conductor plane 11, the input-output terminal 310c is connected to the land 21L3, and the input-output terminal 310d is connected to the land 21L2.

The land 21L1 is connected to the first connection conductor 21. The lands 21L2 and 21L3 are connected to a RFIC 60.

Mounting the module 40, in which the power supply coil and the connection conductor are integrated, on the circuit board as described above provides the electrical continuity between the coupling conductor pattern 313b (see FIG. 8) of the module 40 and the first connection conductor 21 via the land 21L1. In other words, the first connection conductor 21 is directly connected to a second conductor plane 12 at one end and electrically continuous with the first conductor plane 11 at the other end through the land 21L1 and the coupling conductor pattern 313b.

In this way, in the present preferred embodiment, flexibility in determining the location of the module 40 in which the power supply coil and the connection conductor are integrated is increased, compared with the previous preferred embodiments where it is necessary to place the power feed coil at such a position that the magnetic flux $\phi 1$ of the power feed coil interlinks with the first connection conductor 21. Further, the modularization of the power feed coil and the coupling conductor pattern enables to have more secure magnetic coupling between the first connection conductor 21 and the power feed coil disposed in the module 40, and stabilize the antenna characteristics.

Seventh Preferred Embodiment

In the seventh preferred embodiment of the present invention, a configuration of another module 41 in which a power feed coil and a connection conductor are integrated is described. The module 41 is different from that of the sixth preferred embodiment.

Figure 11:
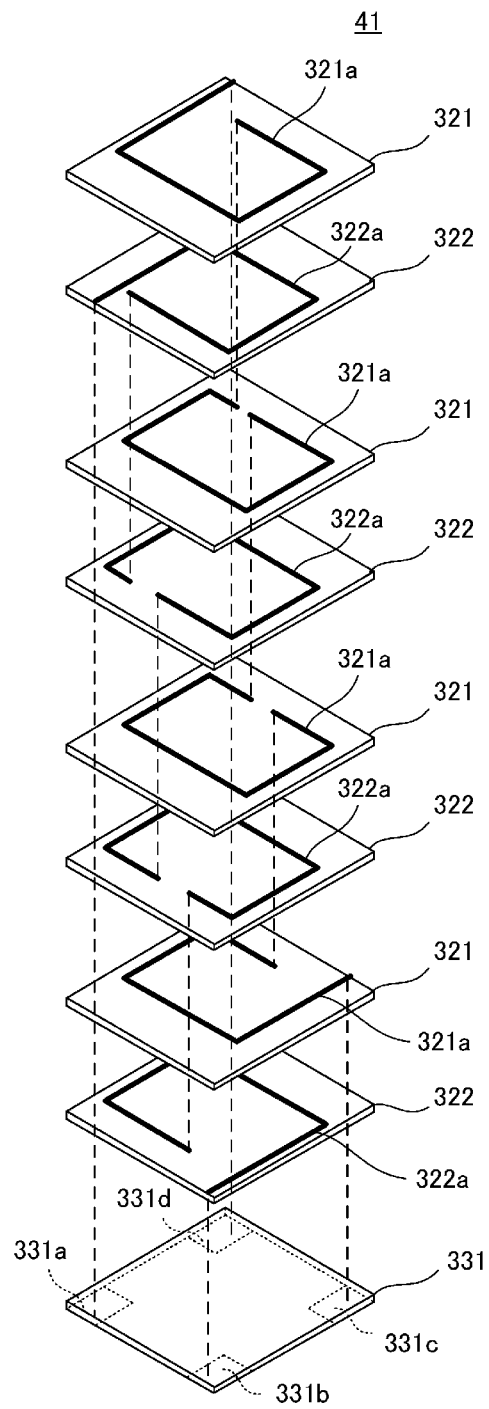
FIG. 11 is an exploded perspective view of a module 41 according to a seventh preferred embodiment of the present invention, in which a power feed coil and a connection conductor are integrated.
Figure 12:
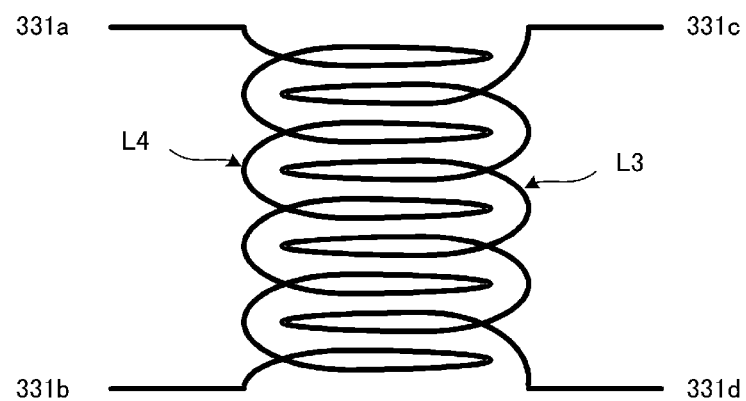
FIG. 12 is an image view of a power feed coil according to a seventh preferred embodiment of the present invention.

FIG. 11 is an exploded perspective view of the module 41 according to the seventh preferred embodiment, in which a power feed coil and a connection conductor are integrated. FIG. 12 is an image view of the power feed coil according to the seventh preferred embodiment. The module 41 is a multilayer structure in which magnetic layers 321 and magnetic layers 322 are stacked on top of each other in an alternating fashion. A coil conductor pattern 321a is provided on each magnetic layer 321. A coupling conductor pattern 322a is provided on each magnetic layer 322.

The coil conductor patterns 321a provided on the corresponding magnetic layers 321 are electrically continuous with each other through via-conductors, and define a single coil L3. Similarly, the coupling conductor patterns 322a provided on the corresponding magnetic layers 322 define a single coil L4. As illustrated in FIG. 12, these coils L3 and L4 are each configured so as to be wound about the same axis.

A non-magnetic layer 331, on which input-output terminals 311a, 311b, 311c, and 311d are provided, is stacked as the bottom layer of the module 41. The input-output terminals 331a and 331b are connected to the respective terminals of the coil L4. The input-output terminals 331c and 331d are connected to the respective terminals of the coil L3. In other words, the input-output terminals 331a and 331b are input-output terminals of the coil L4, and the input-output terminals 331c and 331d are input-output terminals of the coil L3.

Figure 13:
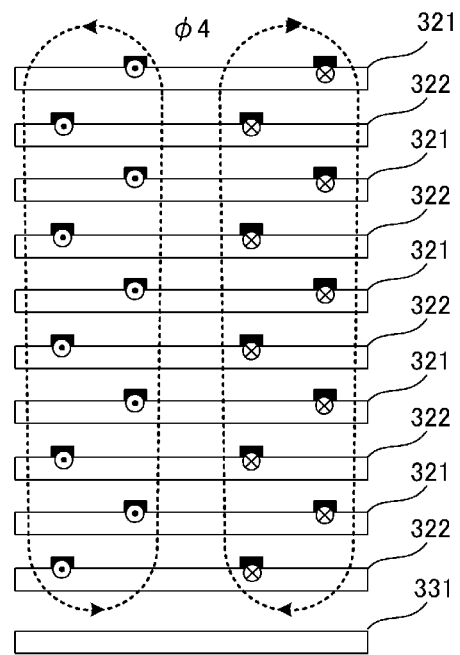
FIG. 13 is an exploded cross-section view of the module 41.

FIG. 13 is an exploded cross-section view of the module 41. A magnetic flux $\phi 4$ illustrated in FIG. 13 represents a magnetic flux produced by a current flowing through the coil L3. This magnetic flux $\phi 4$ induces a current in the coil L4. This allows the coil L3 and the coil L4 to be magnetically coupled within the module 41.

When the module 41 is mounted on the circuit board illustrated in FIG. 10, the module 41 is mounted in such a way that the input-output terminal 331a is connected to the land 21L1, the input-output terminal 331b is connected to the first conductor plane 11, the input-output terminal 331c is connected to the land 21L3, and the input-output terminal 331d is connected to the land 21L2. Accordingly, a series circuit of the first connection conductor 21 and the coil 4 of the module 41 is configured to be connected between the first conductor plane 11 and the second conductor plane 12.

In the example of FIG. 11, the power feed coil conductor patterns and the coupling conductor patterns are arranged in an alternating fashion. However, such an alternating arrangement is not always required. Further, the materials of layers are not limited to the foregoing structure. They may be arbitrarily designed depending on the coupling amount of two conductor patterns or any other factor.

Eighth Preferred Embodiment

In the eighth preferred embodiment of the present invention, an example different from the modules according to the sixth and seventh preferred embodiments, in which a power feed coil and a connection conductor are integrated, is described. In the sixth and seventh preferred embodiments, the coil winding axis of power feed coil is in a stacking direction whereas in the eighth preferred embodiment the coil winding axis of power feed coil is perpendicular or substantially perpendicular to the stacking direction.

Figure 14:
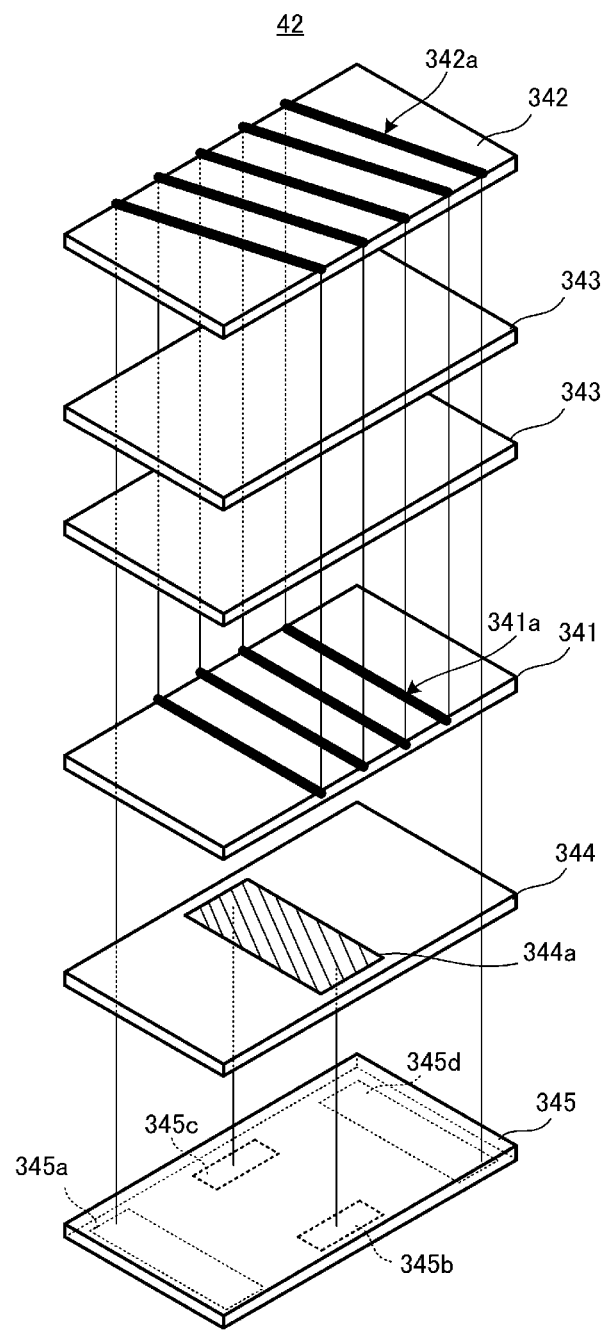
FIG. 14 is an exploded perspective view of a module 42 according to an eighth preferred embodiment of the present invention, in which a connection conductor is combined.

FIG. 14 is an exploded perspective view of a module according to the eighth preferred embodiment, in which a connection conductor is integrated. The module 42 in which a connection conductor is integrated includes a non-magnetic layer 341, a plurality of magnetic layers 343, and a magnetic layer 342, and has a multilayer structure in which the plurality of magnetic layers 343 is interposed between the non-magnetic layer 341 and the magnetic layer 342. Coil conductor patterns 341a, which are portions of a coil pattern, are provided on the non-magnetic layer 341. Coil conductor patterns 342a, which are portions of the coil pattern, are provided on the magnetic layer 342. Side via-conductors, which are not illustrated in the drawing, are provided on side surfaces of the plurality of magnetic layers 343 to connect the coil conductor patterns 341a of the non-magnetic layer 341 and the coil conductor patterns 342a of the magnetic layer 342.

The coil conductor patterns 341a and 342a are provided on the non-magnetic layer 341 and the magnetic layer 342 so that a coil winding axis is perpendicular or substantially perpendicular to the stacking direction.

A non-magnetic layer 344, on which a coupling electrode pattern 344a is provided, is stacked below the non-magnetic layer 341. The coupling electrode pattern 344a has a rectangular or substantially rectangular shape, and a longer direction thereof is perpendicular or substantially perpendicular to the coil winding axis of the coil defined by the coil conductor patterns 341a and 342a.

A non-magnetic layer 345, on which input-output terminals 345a, 345b, 345c, and 345d are provided, is stacked below the non-magnetic layer 344. The input-output terminals 345a and 345d are connected to respective terminals of the coil formed of the coil conductor patterns 341a and 342a. In other words, the input-output terminals 345a and 345d are input-output terminals of the coil.

Figure 15:
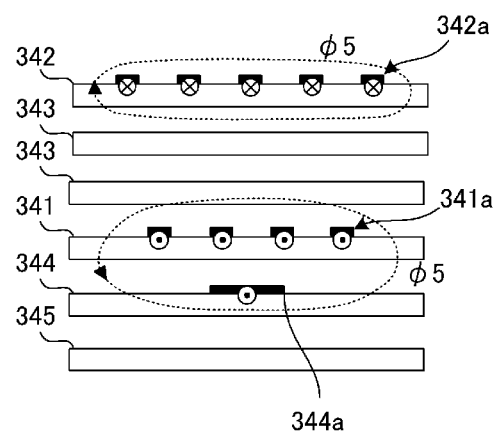
FIG. 15 is an exploded cross-section view of the module 42.

FIG. 15 is an exploded cross-section view of the module 42. A magnetic flux ϕ5 illustrated in FIG. 15 represents a magnetic flux produced by a current flowing through the coil formed of the coil conductor patterns 341a and 342a. This magnetic flux ϕ5 induces a current in the coupling electrode pattern 344a. Accordingly, the coil defined by the coil conductor patterns 341a, 342a and the coupling electrode pattern 344a are magnetically coupled with each other within the module 42. As described in the sixth and seventh preferred embodiments, the module 42 is magnetically coupled with the first connection conductor 21 when the module 42 is mounted in such a way that the coupling electrode pattern 344a is electrically continuous with the first connection conductor 21.

Figure 16A:
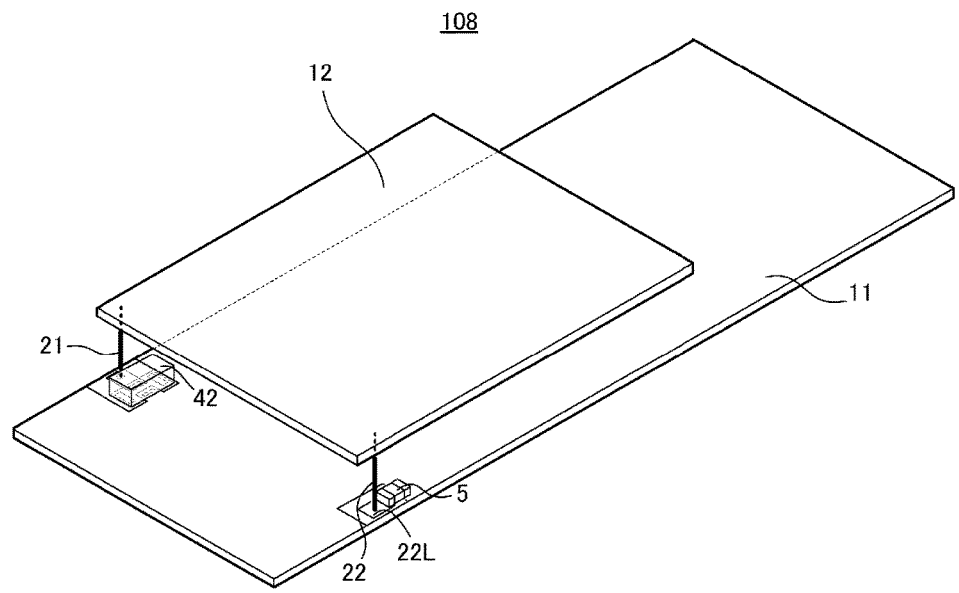
FIG. 16A is a perspective view of an antenna device 108 on which the module 42 is mounted.
Figure 16B:
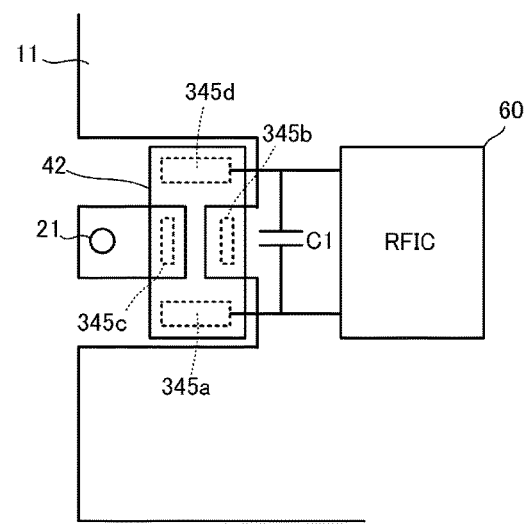
FIG. 16B is a plan view of a mounting portion on which the module 42 is mounted.

FIG. 16A is a perspective view of an antenna device 108 on which the foregoing module 42 is mounted, and FIG. 16B is a plan view of a mounting portion on which the module 42 is mounted. The input-output terminals 345a and 345d are connected to lands to which a RFIC 60 and a capacitor C1 are connected. The input-output terminal 345b is connected to the first conductor plane 11, and the input-output terminal 345c is connected to a land on which the first connection conductor 21 is mounted.

In FIG. 14, two magnetic layers are provided as the plurality of magnetic layers 343. Of these two magnetic layers, the upper side magnetic layer (magnetic layer that is different from the magnetic layer disposed directly above the coil conductor pattern 341a) may be replaced by a non-magnetic layer.

Further, the non-magnetic layer 344 may be replaced by a magnetic layer. This arrangement may strengthen the magnetic coupling between the power feed coil 30 and the coupling electrode pattern 344a. Further, the replacement of the non-magnetic layer 344 with a magnetic layer may increase an inductance value.

Still further, the non-magnetic layers 341 and 344 may be replaced by magnetic layers, or the magnetic layers 342 and 343 may be replaced by non-magnetic layers. Whether these layers are magnetic or non-magnetic may be arbitrarily determined depending on objectives.

Ninth Preferred Embodiment

Figure 17A:
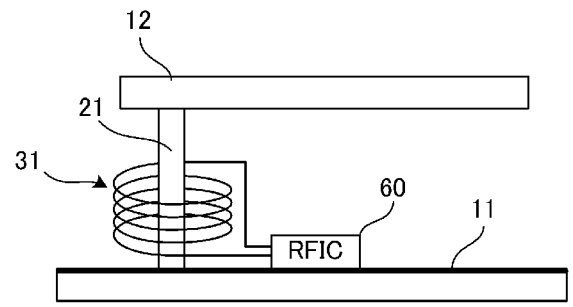
FIG. 17A is a view illustrating a configuration of a coupling portion with a first connection conductor 21 of an antenna device according to a ninth preferred embodiment of the present invention.
Figure 17B:
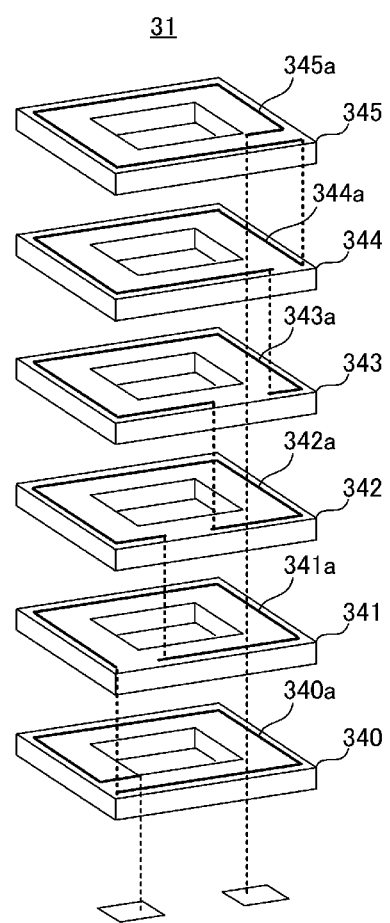
FIG. 17B is an exploded perspective view of a power feed coil 31.

FIG. 17A is a view illustrating a configuration of a coupling portion with a first connection conductor 21 of an antenna device according to the ninth preferred embodiment of the present invention, and FIG. 17B is an exploded perspective view of a power feed coil 31.

In the present preferred embodiment, the power feed coil 31 includes a coil wound around the first connection conductor 21 that connects a first conductor plane 11 and a second conductor plane 12. A magnetic flux is produced when a current flows through this coil, and this magnetic flux induces a current in the first connection conductor 21. Thus, the power feed coil 31 and the first connection conductor 21 are magnetically coupled with each other.

As illustrated in FIG. 17B, in the power feed coil 31, coil conductor patterns 340a to 345a are provided on a plurality of magnetic layers 340 to 345. Via-conductors provide connections between the layers. Input-output terminals are provided on the bottom surface of the magnetic layer 340 (separated for illustration purpose in FIG. 17B).

Figure 18:
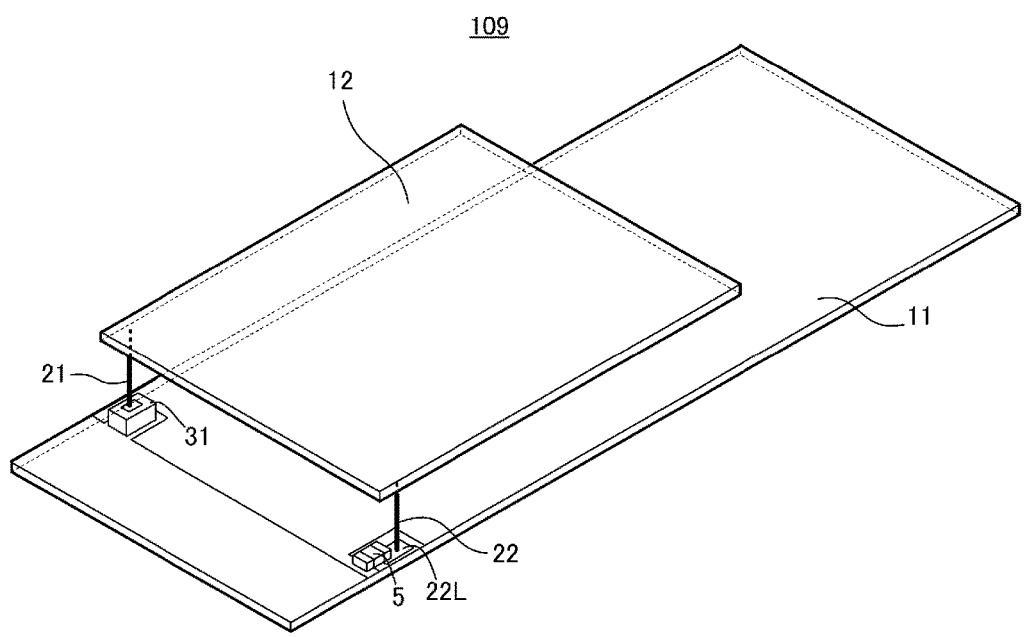
FIG. 18 is a perspective view of an antenna device 109 according to the ninth preferred embodiment of the present invention.

FIG. 18 is a perspective view of an antenna device 109 according to the ninth preferred embodiment. The foregoing power feed coil 31 is disposed so that the first connection conductor 21 is inserted through the power feed coil 31. The configuration of a second connection conductor 22 portion is similar to the one described in the first preferred embodiment.

Tenth Preferred Embodiment

Figure 19A:
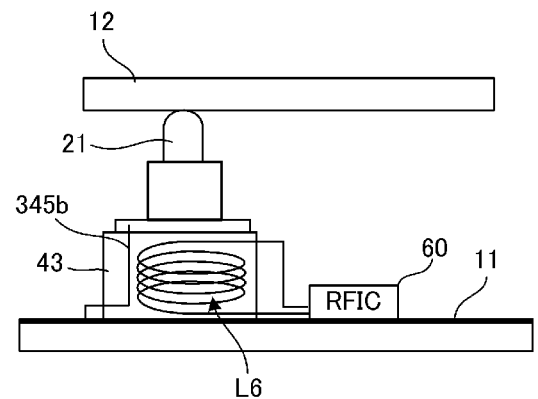
FIG. 19A is a view illustrating configurations of a first connection conductor and a power feed coil of an antenna device according to a tenth preferred embodiment of the present invention.
Figure 19B:
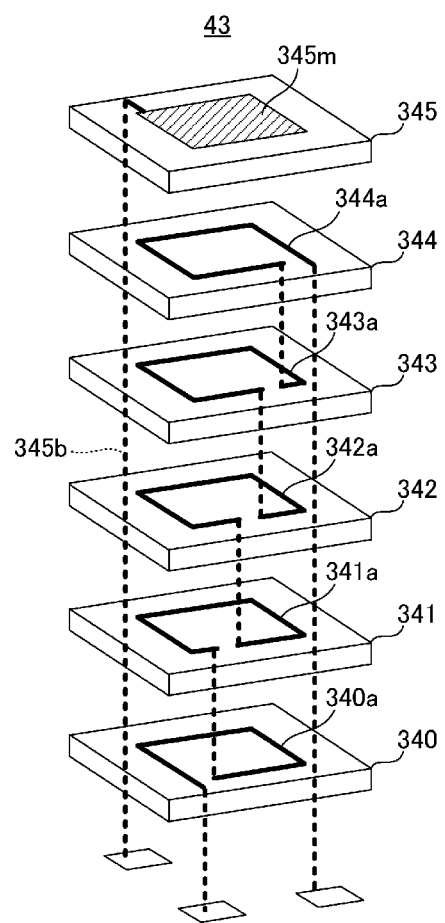
FIG. 19B is an exploded perspective view of a module 43 in which a power feed coil and a connection conductor are integrated.

FIG. 19A is a view illustrating configurations of a first connection conductor and a power feed coil of an antenna device according to the tenth preferred embodiment of the present invention, and FIG. 19B is an exploded perspective view of a module 43 in which the power feed coil and the connection conductor are integrated.

In the present preferred embodiment, the module 43 in which the power feed coil and the connection conductor are integrated preferably is formed by uniting a coil L6 and a coupling electrode 345b. On the top of the module 43, a first connection conductor 21, which is formed as a pin terminal, is disposed. In that state, the coupling electrode 345b is connected to the first connection conductor 21.

As illustrated in FIG. 19B, in the module 43, coil conductor patterns 340a to 344a and a pin terminal mounting electrode 345m are provided on a plurality of magnetic layers 340 to 345. Via-conductors provide connections between the layers. Input-output terminals are provided on the bottom surface of the magnetic layer 340 (separated for illustration purpose in FIG. 19B). The pin terminal 21 is connected to the electrode 345m.

Figure 20:
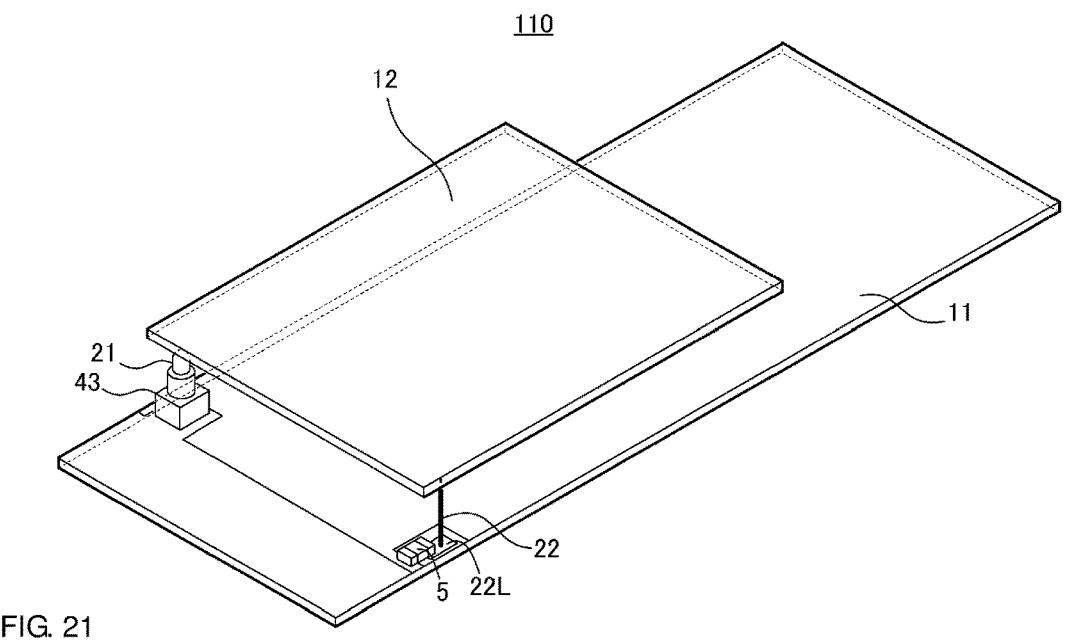
FIG. 20 is a perspective view of an antenna device 110 according to the tenth preferred embodiment of the present invention.

FIG. 20 is a perspective view of an antenna device 110 according to the tenth preferred embodiment of the present invention. The foregoing module 43 is disposed so that a series circuit of the first connection conductor 21 and the coupling electrode 345b is connected between a first conductor plane 11 and a second conductor plane 12. The configuration of a second connection conductor 22 portion is similar to the one described in the first preferred embodiment.

Alternatively, an additional magnetic layer may be interposed between the magnetic layer 344 and the magnetic layer 345 to provide magnetic shielding between the coil conductor pattern 344a and the pin terminal mounting electrode 345m of FIG. 19(B). This arrangement allows shielding a magnetic flux produced by the coil conductor patterns 340a to 344a and suppresses induction of an eddy current at the pin terminal mounting electrode 345m.

Eleventh Preferred Embodiment

Figure 21:
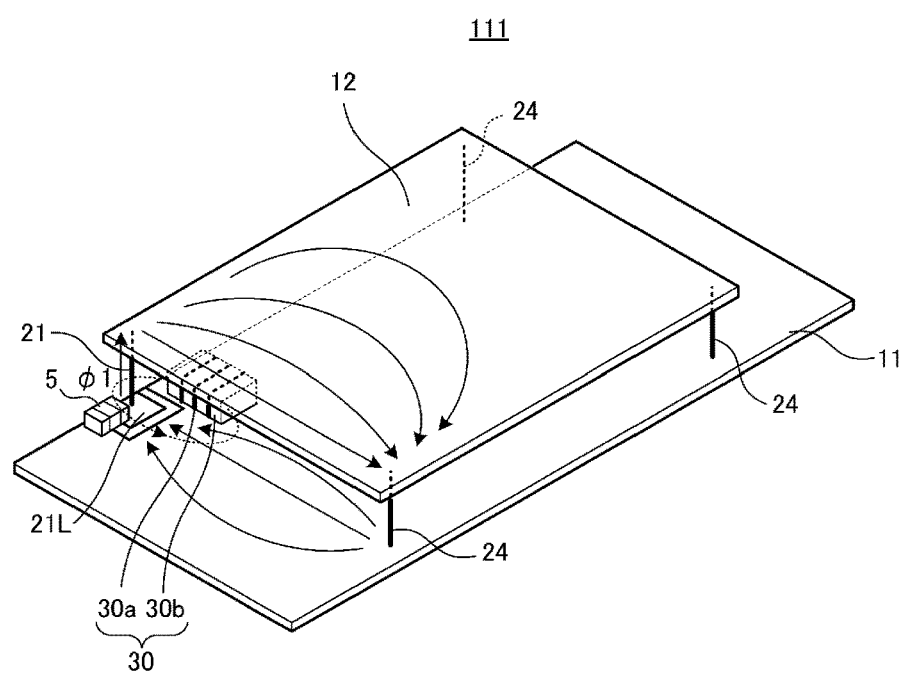
FIG. 21 is a perspective view of an antenna device 111 according to an eleventh preferred embodiment of the present invention.

FIG. 21 is a perspective view of an antenna device 111 according to the eleventh preferred embodiment of the present invention. In this example, a first conductor plane 11 includes a cutout pattern at a portion thereof, and in this portion, a land 21L is provided. The land 21 is not electrically continuous with the first conductor plane 11. A first connection conductor 21 is connected to a second conductor plane 12 at a first end and the land 21L at a second end. A chip capacitor 5 connects the first conductor plane 11 and the land 21L. In other words, the first conductor plane 11 and the second conductor plane 12 are electrically continuous through the first connection conductor 21, the land 21L, and the chip capacitor 5.

In the antenna device 111 of FIG. 21, a power feed coil 30 is disposed so that a coil winding axis is parallel or substantially parallel to an opening plane located between the first conductor plane 11 and one side of the second conductor plane 12.

Further, the second conductor plane 12 is grounded to the first conductor plane 11 with third connection conductors 24 at three locations. The third connection conductor 24 is connected to the second conductor plane 12 at a position near each corner portion thereof except the corner portion where the first connection conductor 21 is disposed.

In the example illustrated in FIG. 1, the LC resonant circuit includes the inductance components of the first connection conductor 21 and the second conductor plane 12 and the capacitance of the second connection conductor 22. On the other hand, in the eleventh preferred embodiment, a LC resonant circuit is preferably provided by disposing the chip capacitor 5 on the first connection conductor 21 side. In this way, components such as the chip capacitor 5, the power feed coil 30, and the like are arranged in a single area to prevent the components from being scattered while achieving space-saving.

Twelfth Preferred Embodiment

Figure 22:
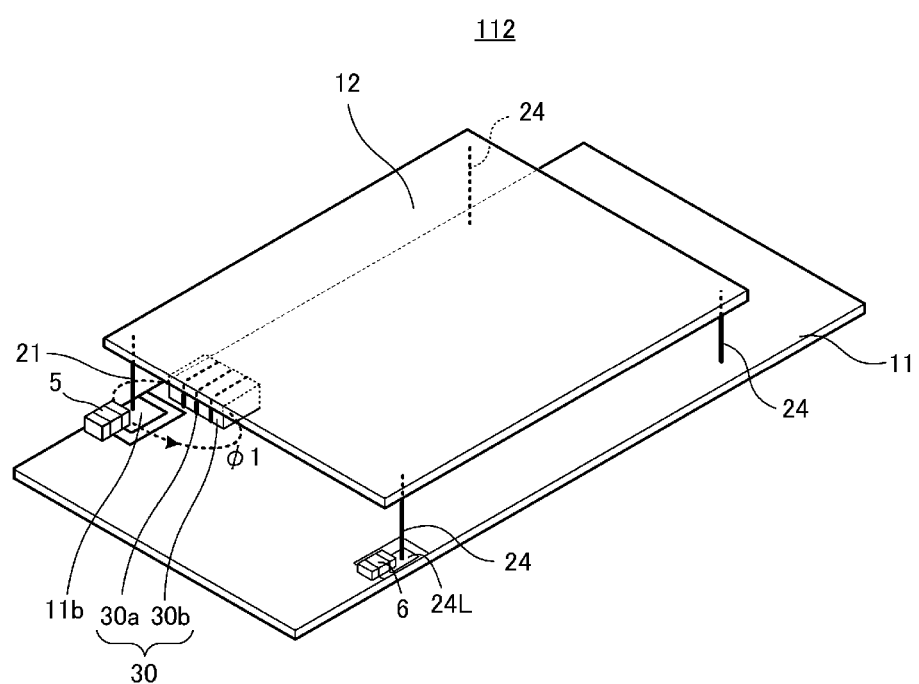
FIG. 22 is a perspective view of an antenna device 112 according to another example of a twelfth preferred embodiment of the present invention.

FIG. 22 is a perspective view of an antenna device 112 according to another example of the twelfth preferred embodiment of the present invention. In this example, a chip inductor 6 is added to a third connection conductor 24. In other words, a first conductor plane 11 and a second conductor plane 12 are electrically continuous through the third connection conductor 24, a land 24L, and the chip inductor 6. The inductance of the chip inductor 6 is determined so that a LC resonant circuit resonates at a carrier frequency band of communication signals or near the carrier frequency band. This enables to adjust the resonant frequency.

Thirteenth Preferred Embodiment

Figure 23:
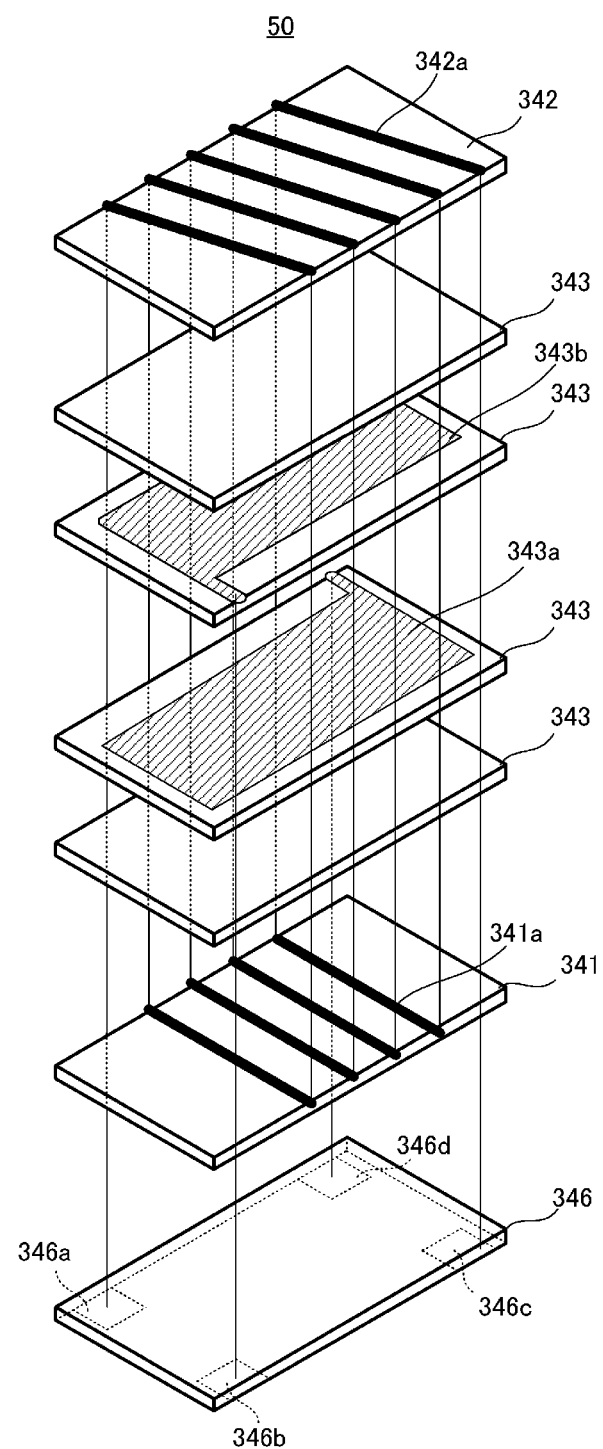
FIG. 23 is an exploded perspective view of a module, in which a power feed coil and a capacitor are integrated, for use in an antenna device according to a thirteenth preferred embodiment of the present invention.

FIG. 23 is an exploded perspective view of a module, in which a power feed coil and a capacitor are integrated, for use in an antenna device according to the thirteenth preferred embodiment of the present invention. A module 50 according to the thirteenth preferred embodiment, in which a power feed coil and a capacitor are integrated, includes a power feed coil and a capacitor. More specifically, as illustrated in FIG. 23, the module 50 includes a non-magnetic layer 341, a plurality of magnetic layers 343, and a magnetic layer 342, and has a multilayer structure in which the plurality of magnetic layers 343 is interposed between the non-magnetic layer 341 and the magnetic layer 342. Coil conductor patterns 341a, which are portions of a coil pattern, are provided on the non-magnetic layer 341. Coil conductor patterns 342a, which are portions of the coil pattern, are provided on the magnetic layer 342.

Further, plane conductor patterns 343a and 343b that define a capacitor in a direction facing the stacking direction are formed on two layers of the plurality of magnetic layers 343, which are positioned at a coil winding center portion. The intensity of a magnetic field produced by the coil pattern is the highest near the coil conductor patterns 341a and 342a, and decreases as the position moves closer to the winding center portion. Accordingly, providing the capacitor near the winding center portion does not affect the antenna characteristics.

A non-magnetic layer 346, on which input-output terminals 346a, 346b, 346c, and 346d are provided, is stacked below the non-magnetic layer 341. The input-output terminals 346a and 346c are connected to respective end portions of the coil pattern. In other words, the input-output terminals 346a and 346c serve as input-output terminals of the coil. Further, the input-output terminal 346b is connected to the plane conductor pattern 343b, and the input-output terminal 346d is connected to the plane conductor pattern 343a. In other words, the input-output terminals 346b and 346d define and serve as input-output terminals of the capacitor.

Alternatively, the non-magnetic layer 341, the magnetic layer 342, the plurality of magnetic layers 343, and the non-magnetic layer 346 may all be magnetic layers. As a result, a large inductance value is obtained. However, it should be noted that replacing the plurality of magnetic layers 343 with non-magnetic layers allows to reduce effects of the plane conductor patterns 343a and 343b on the coil pattern.

Figure 24A:
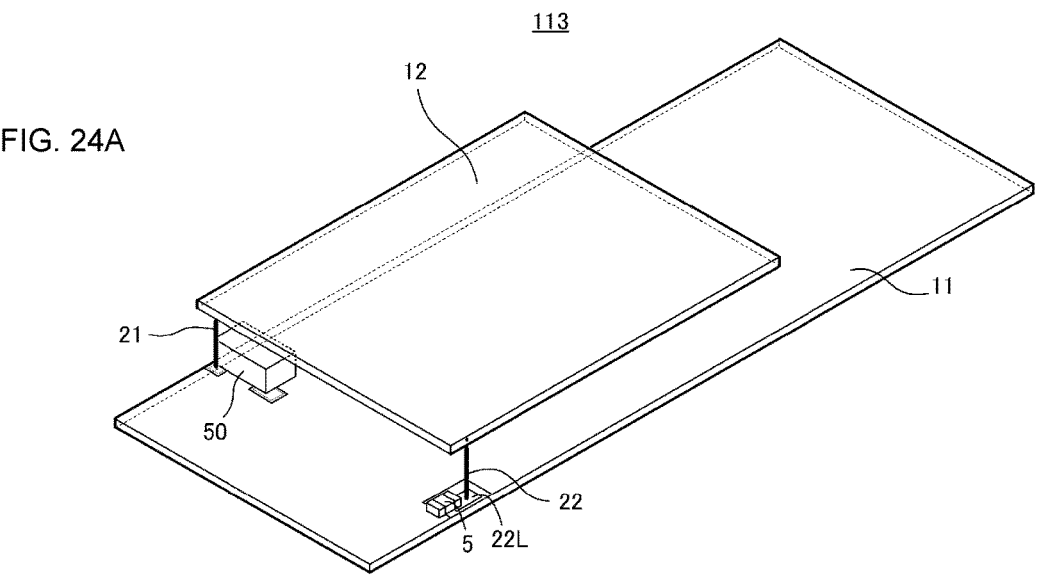
FIG. 24A is a perspective view of an antenna device 113 according to a preferred embodiment of the present invention.
Figure 24B:
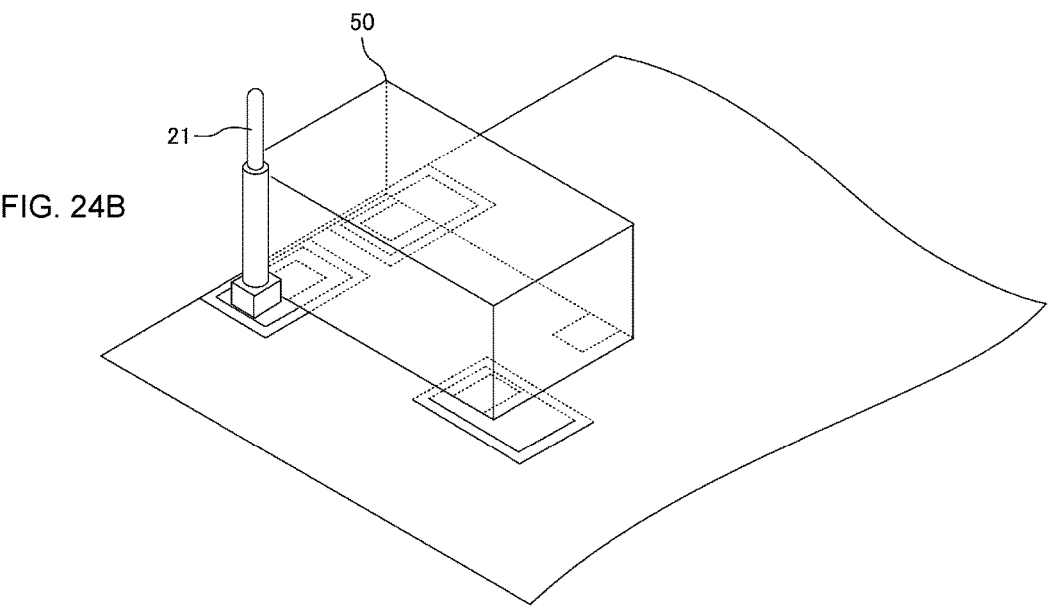
FIG. 24B is a perspective view of a power feed portion thereof.
Figure 25:
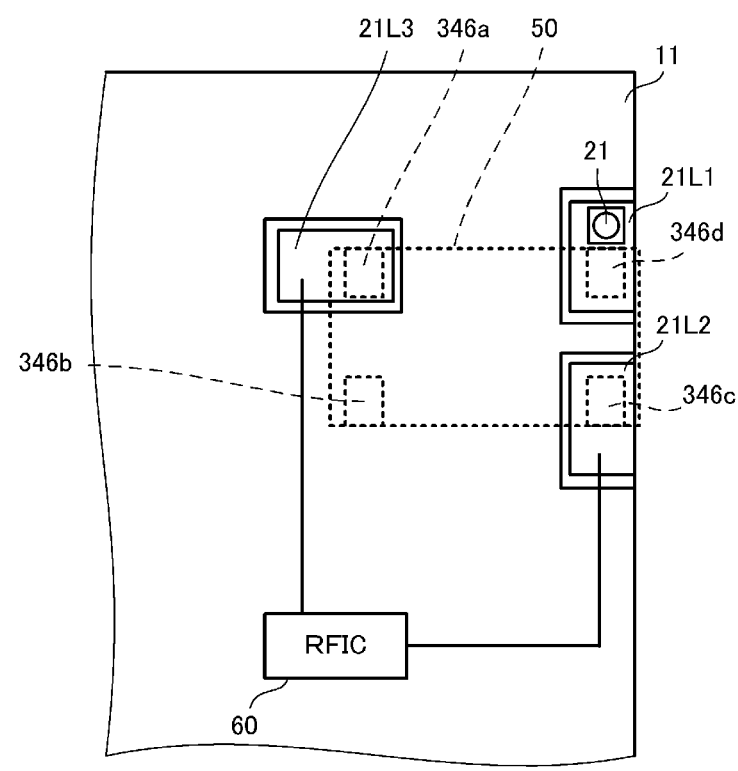
FIG. 25 is a plan view of a mounting portion of a module 50.

FIG. 24A is a perspective view of an antenna device 113 according to the present preferred embodiment, and FIG. 24B is a perspective view of a power feed portion thereof. Further, FIG. 25 is a plan view of a mounting portion of the module 50. Further, FIG. 26 is a view illustrating configurations of the module 50 and a circuit connected thereto.

Figure 26:
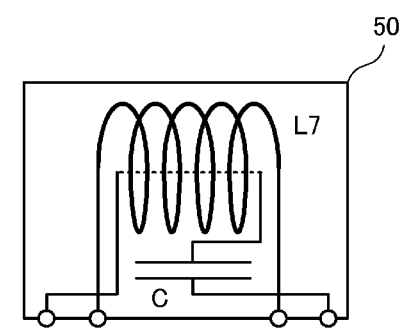
FIG. 26 is a view illustrating configurations of the module 50 and a circuit connected thereto.
Figure 26:
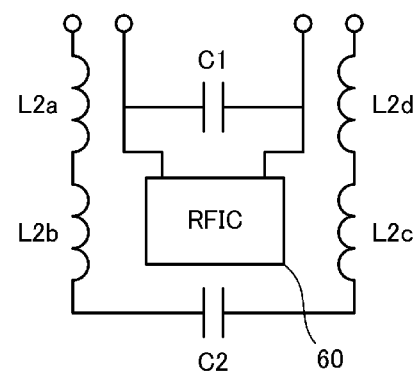

In FIG. 26, inductors L2a, L2b, L2c, and L2d correspond to inductance components of a first connection conductor 21, a second connection conductor 22, a first conductor plane 11, and a second conductor plane 12. A capacitor C2 corresponds to a capacitance of a chip capacitor 5. An inductor L7 inside the module 50 is an inductor of the coil pattern illustrated in FIG. 23, and a capacitor C inside the module 50 is the capacitor illustrated in FIG. 23.

As illustrated in FIG. 25, on a circuit board, the first conductor plane 11 that serves as a ground conductor pattern and lands 21L1, 21L2, and 21L3 are provided. The module 50 is mounted in such a way that the input-output terminal 346a and the land 21L3, the input-output terminal 346b and the first conductor plane 11, the input-output terminal 346c and the land 21L2, and the input-output terminal 346d and the land 21L1 are each electrically continuous. The lands 21L2 and 21L3 are connected to a RFIC 60. On the land 21L1, the first connection conductor (pin) 21 is mounted.

In this way, it is possible to decrease the number of components and reduce mounting space by using the module in which the power feed coil and the capacitor are integrated.

Further, the capacitor included in the module 50 may be provided in the stacking direction or a direction perpendicular or substantially perpendicular to the stacking direction, namely, a direction along the surface of each layer. Further, a plurality of capacitors may be provided in the module 50.

Fourteenth Preferred Embodiment

Figure 27:
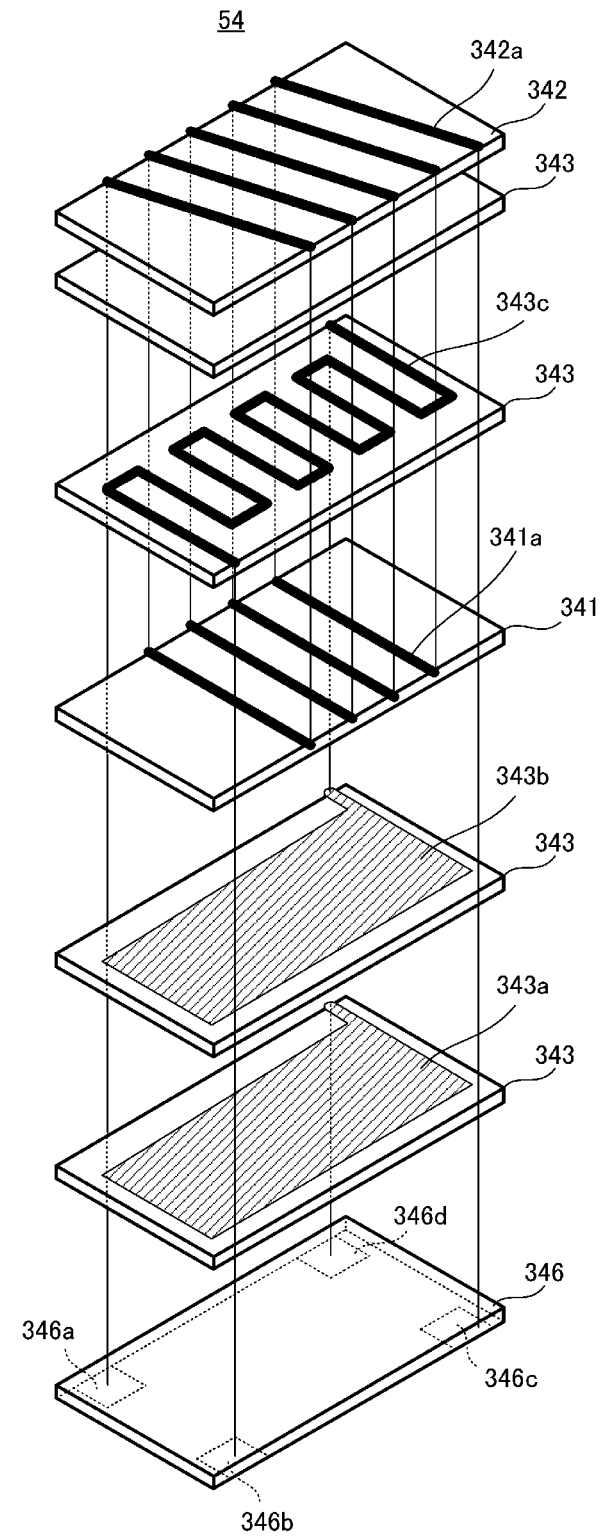
FIG. 27 is an exploded perspective view of a module 54, in which a power feed coil, a capacitor, and a connection conductor are integrated, for use in an antenna device according to a fourteenth preferred embodiment of the present invention.

FIG. 27 is an exploded perspective view of a module 54, in which a power feed coil, a capacitor, and a connection conductor are integrated, for use in an antenna device according to the fourteenth preferred embodiment of the present invention. The module 54 is configured in such a way that magnetic layers 343 on which plane conductor patterns 343a and 343b are provided are stacked below a non-magnetic layer 341 and a magnetic layer 342. Coil conductor patterns 341a and 342a that are portions of a coil pattern are provided on the non-magnetic layer 341 and the magnetic layer 342. In other words, a capacitor is disposed between a coil of the module 54 and a first conductor plane

(11) on a mounting surface side. This arrangement allows to have a more distance from the first conductor plane (11) to the coil and reduce effects of the first conductor plane (11).

Further, an electrode pattern 343c preferably having a meander line shape is disposed on one of the magnetic layers 343 arranged between the non-magnetic layer 341 and the magnetic layer 342. One end of the electrode pattern 343c is electrically continuous with the plane conductor pattern 343b, and the other end thereof is electrically continuous with an input-output terminal 346b, through a side-via that is not illustrated in the drawing. The plane conductor pattern 343a is electrically continuous with an input-output terminal 346d.

Accordingly, the module 54 has a configuration such that a LC series resonant circuit is connected between the input-output terminals 346b and 346d. The LC series resonant circuit includes the capacitor including the plane conductor patterns 343a, 343b and an inductor including the electrode pattern 343c. The inductor including the electrode pattern 343c may compensate the inductance component of the first connection conductor 21 and the second conductor plane 12. This makes it possible to achieve the LC resonant circuit that resonates at a carrier frequency band of communication signals or near the carrier frequency band.

Alternatively, the plurality of magnetic layers 343 may be replaced by non-magnetic layers, or the non-magnetic layers 341 and 346 may be replaced by magnetic layers.

Fifteenth Preferred Embodiment

Figure 28:
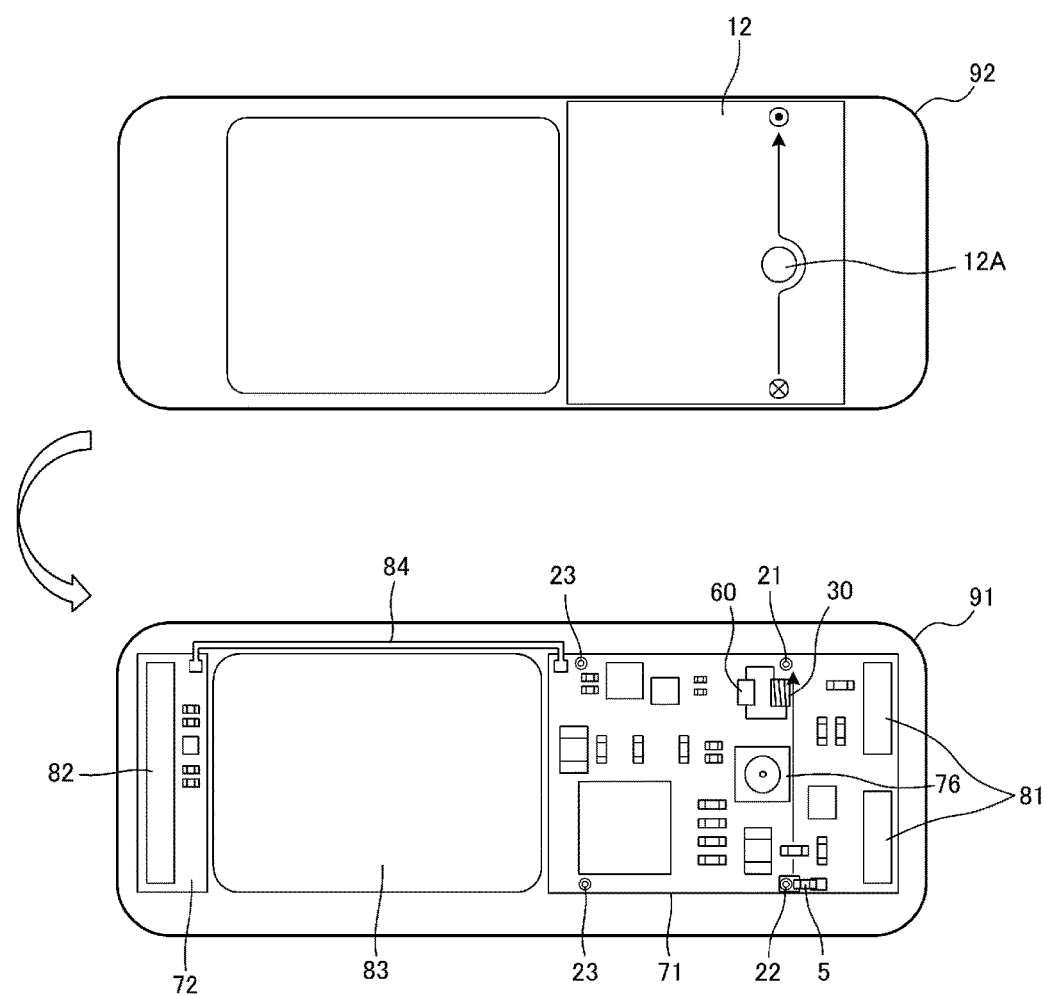
FIG. 28 is a plan view illustrating a structure inside a casing of a communication terminal device according to a fifteenth preferred embodiment of the present invention.

FIG. 28 is a plan view illustrating a structure inside a casing of a communication terminal device according to the fifteenth preferred embodiment of the present invention. Circuit boards 71 and 72, a battery pack 83, and the like are fitted inside an upper casing 91. A RFIC 60 including a communication circuit, a power feed coil 30, and the like are mounted on the circuit board 71. On this circuit board 71, a UHF band antenna 81, a camera module 76, and the like are also mounted. A UHF band antenna 82 and the like are mounted on the circuit board 72. A circuit on the circuit board 71 and a circuit on the circuit board 72 are connected to each other through a coaxial cable 84.

A ground conductor provided on the circuit board 71 defines and serves as the first conductor plane. A lower casing is made of resin, but its inner surface is coated with a metal film to provide a second conductor plane 12. An opening 12A is provided in the second conductor plane 12. An opening is also provided on the casing at a position corresponding to the opening 12A so as to optically expose a lens of the camera module 76 to the outside from these openings.

Further, the circuit board 71 is provided with pin terminals that serve as a first connection conductor 21 and a second connection conductor 22. The circuit board 71 is also provided with additional pin terminals 23. When the lower casing 92 is covered by the upper casing 91, these pin terminals come into contact with the second conductor plane 12 and provide electrical continuity.

The power feed coil 30 is connected to the RFIC 60. The power feed coil 30 is disposed near the first connection conductor 21 and magnetically coupled with the first connection conductor 21.

Sixteenth Preferred Embodiment

Figure 29:
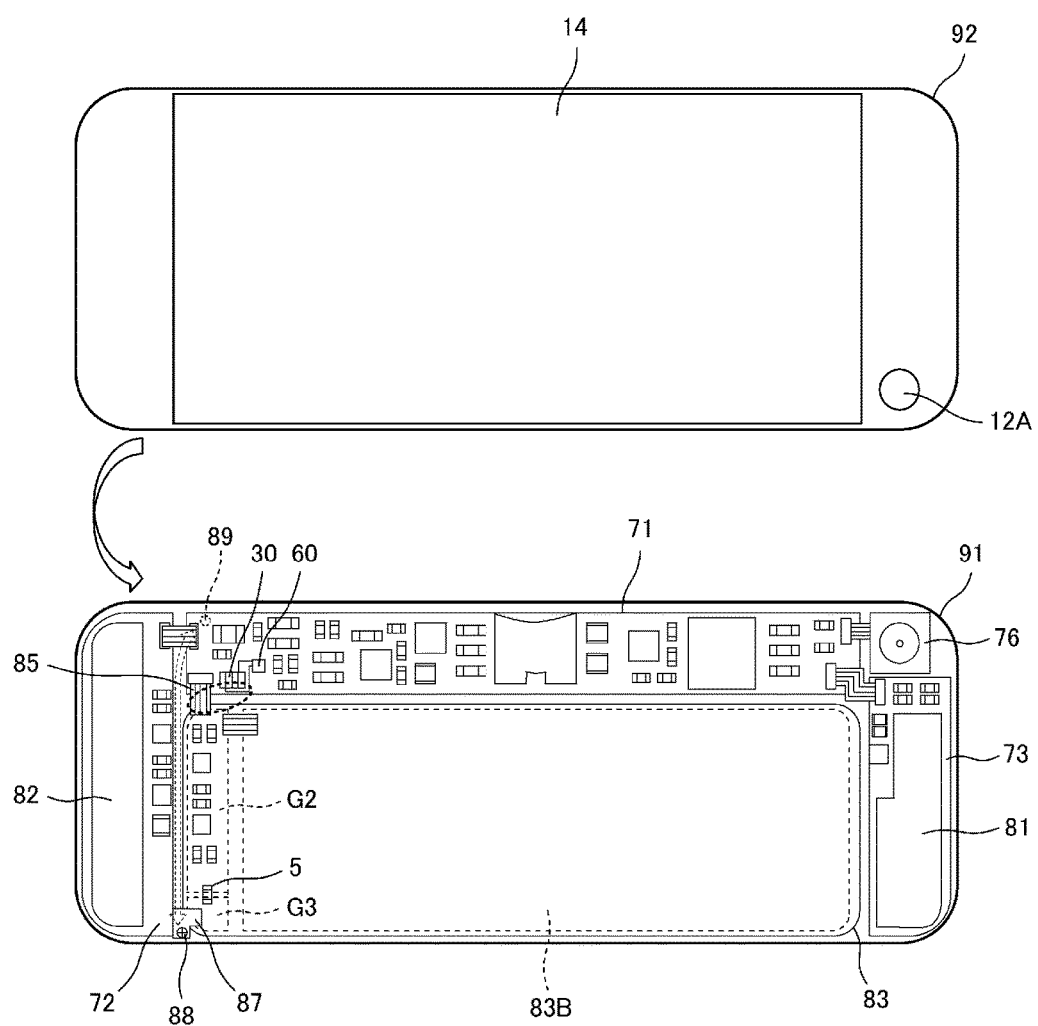
FIG. 29 is a plan view illustrating a structure inside a casing of a communication terminal device according to a sixteenth preferred embodiment of the present invention.

FIG. 29 is a plan view illustrating a structure inside a casing of a communication terminal device according to the sixteenth preferred embodiment of the present invention. Circuit boards 71, 72, and 73, a battery pack 83, and the like are fitted inside an upper casing 91 that serves as a metal casing. A RFIC 60 including a communication circuit, a power feed coil 30, and the like are mounted on the circuit board 71. UHF band antennas 82, 81 and the like are mounted on the circuit boards 72, 73. A lower casing 92 preferably is made of resin and defines a bottom side of the communication terminal device. An opening 12A is provided at the lower casing 92 at a counterpart position of a camera module. A metal film 14 is provided inside the lower casing 92. However, unlike the example illustrated in FIG. 28, the metal film 14 does not define a portion of a looped current path.

A battery main portion 83B and an overcharge/discharge protection circuit are included in the battery pack 83. A chip capacitor 5 is mounted between a ground conductor G2 and an electrode G3 of the overcharge/discharge protection circuit.

The battery pack 83 is connected to the circuit board 71 with a cable 85. Lines of this cable include a line for ground connection. The electrode G3 of the battery pack 83 is connected to the upper casing 91 through a metal plate 87 and a screw 88. Further, a ground conductor of the circuit board 71 is connected to the upper casing 91 through a pin 89.

Figure 30A:
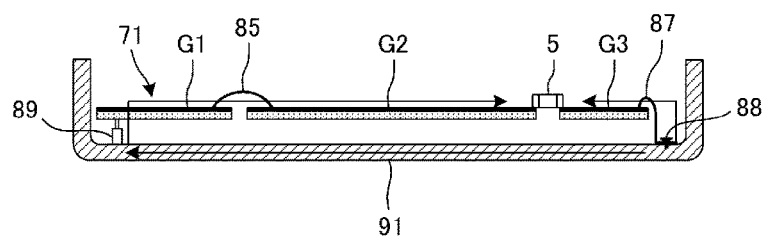
FIG. 30A is a cross-section view (cut along the shorter side direction of a upper casing 91) of a portion where a screw 88 and a pin 89 illustrated in FIG. 29 go through, and FIG. 30B is a cross-section view of the upper casing 91 illustrated in FIG. 29, which is cut along the longer side direction of the upper casing 91.
Figure 30B:
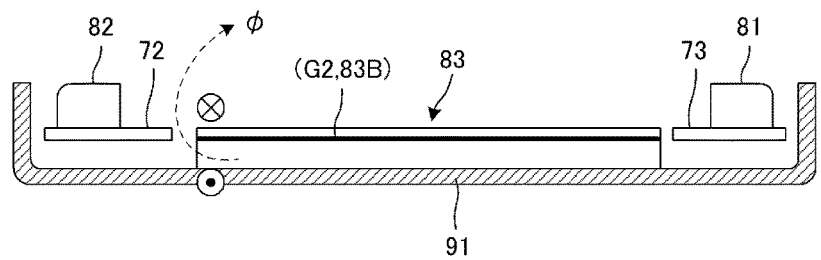

FIG. 30A is a cross-section view (cut along the shorter side direction of the upper casing 91) of a portion where the screw 88 and the pin 89 illustrated in FIG. 29 pass through, and FIG. 30B is a cross-section view of the upper casing 91 illustrated in FIG. 29, which is cut along the longer side direction of the upper casing 91.

As illustrated in FIG. 30A, a looped current path includes the ground conductor G1 of the circuit board 71, the cable 85, the ground conductor G2 in the battery pack, the chip capacitor 5, the electrode G3, the metal plate 87, the upper casing 91, and the pin 89.

A dotted ellipse in FIG. 29 represents a magnetic flux loop. The power feed coil 30 and the cable 85 are arranged close to each other, and the power feed coil 30 magnetically couples with the cable 85. Thus, a resonant current flows in the looped current path illustrated in FIG. 30A. This then induces a magnetic flux $\phi$ that goes through a loop plane of the looped current path as illustrated in FIG. 30B.

Figure 31:
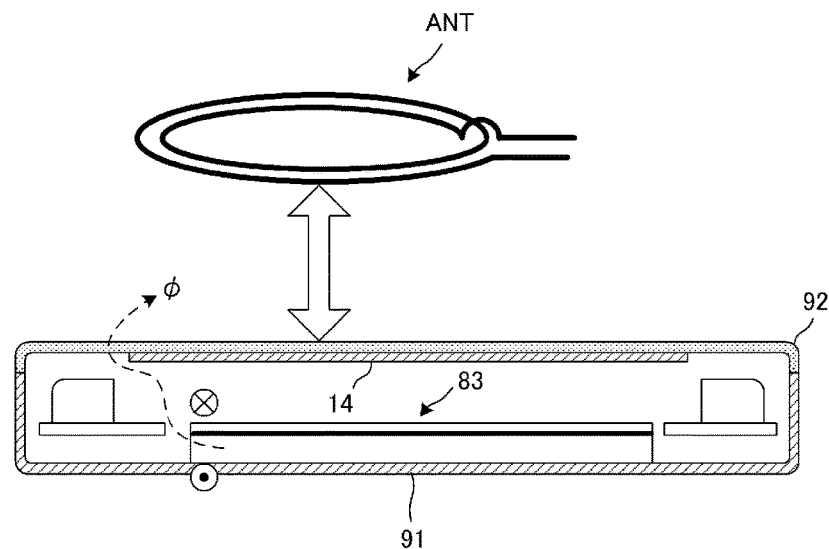
FIG. 31 is a cross-section view of a state where two casings 91 and 92 are joined.

FIG. 31 is a cross-section view of a state where two casings 91 and 92 are joined. The lower casing 92 side is the bottom side of the communication terminal device. When an antenna ANT of a counterpart of communication is placed in proximity, the foregoing looped current path magnetically couples with the antenna ANT.

Figure 32:
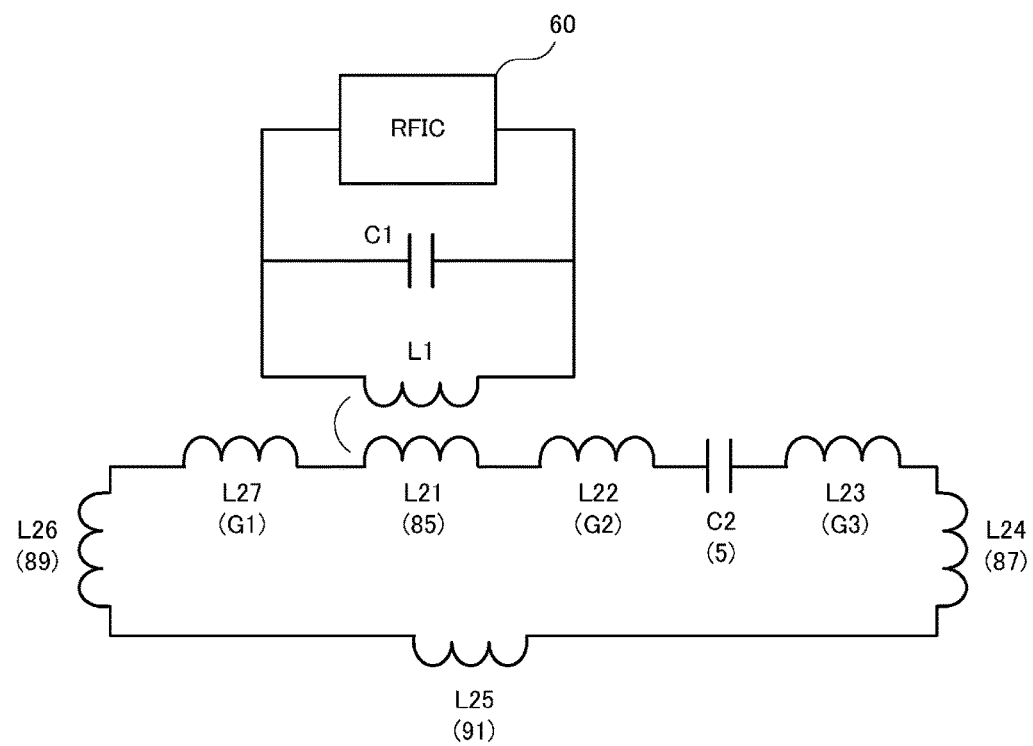
FIG. 32 is an equivalent circuit diagram representing, with a power feed circuit, an antenna device configured in a communication terminal device according to a preferred embodiment of the present invention.

FIG. 32 is an equivalent circuit diagram representing, with a power feed circuit, an antenna device configured in the communication terminal device according to the present preferred embodiment. In FIG. 32, an inductor L1 corresponds to the power feed coil 30, and a capacitor C1 corresponds to a capacitance due to the power feed coil 30 and a RFIC 60. These elements L1 and C1 define a resonant circuit on the power feed coil side.

An inductor L21 corresponds to the cable 85, an inductor L22 corresponds to the ground conductor G2, and an inductor L23 corresponds to the electrode G3. An inductor L24 corresponds to the metal plate 87, an inductor L25 corresponds to the upper casing 91, and an inductor L26 corresponds to the pin 89. Further, an inductor L27 corresponds to the electrode G1. A capacitor C2 corresponds to the chip capacitor 5. These inductors L21 to L27 and the capacitor C2 define a resonant circuit. The level of coupling between the power feed coil side resonant circuit and the radiator element side resonant circuit may be increased as well as the radiation efficiency by matching resonant frequencies of these two resonant circuits to a frequency band of communication frequencies.

Seventeenth Preferred Embodiment

Figure 33:
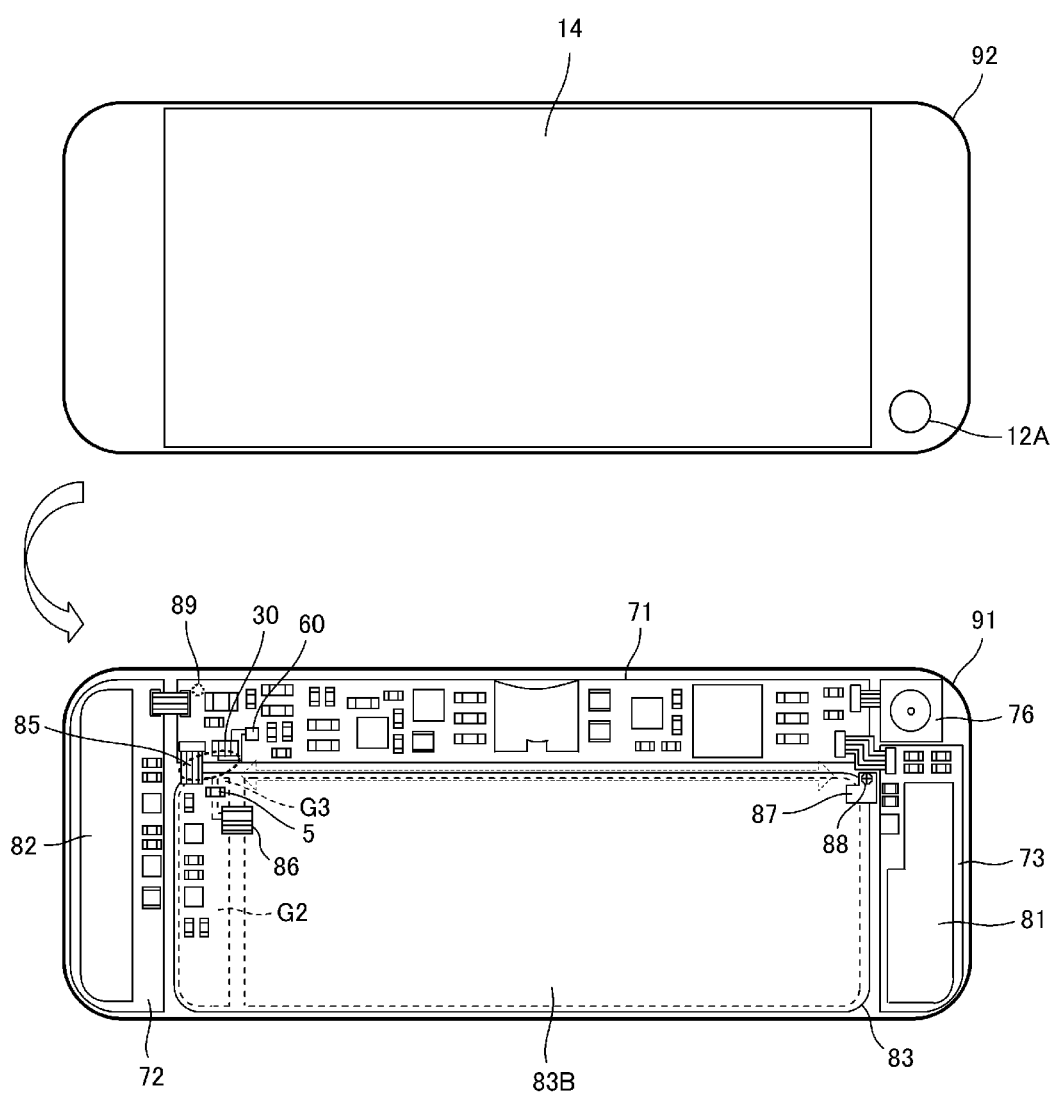
FIG. 33 is a plan view illustrating a structure inside a casing of a communication terminal device according to a seventeenth preferred embodiment of the present invention.

FIG. 33 is a plan view illustrating a structure inside a casing of a communication terminal device according to the seventeenth preferred embodiment of the present invention. Circuit boards 71, 72, and 73, a battery pack 83, and the like are fitted inside a upper casing 91 that is a metal casing. A RFIC 60 including a communication circuit, a power feed coil 30, and the like are mounted on the circuit board 71. UHF band antennas 82, 81 and the like are mounted on the circuit boards 72, 73. A lower casing 92 is made of resin and defines a bottom side of the communication terminal device. An opening 12A is provided at the lower casing 92 at a counterpart position of a camera module. A metal film 14 is provided inside the lower casing 92. However, the metal film 14 does not define a portion of a looped current path.

A battery main portion 83B and an overcharge/discharge protection circuit are included in the battery pack 83. A chip capacitor 5 is mounted between a ground conductor G2 and an electrode G3 of the overcharge/discharge protection circuit.

A cable 86 is connected the battery main portion 83B and the overcharge/discharge protection circuit. The cable 86 includes lines that connect the electrode G3 on the overcharge/discharge protection circuit side and an electrode of the battery pack 83. The electrode of the battery pack 83 is connected to the upper casing 91 through a metal plate 87 and a screw 88. Further, a ground conductor of the circuit board 71 is connected to the upper casing 91 through a pin 89.

In FIG. 33, a looped current path includes the ground conductor of the circuit board 71, a cable 85, the ground conductor G2 in the battery pack, the chip capacitor 5, the electrode G3, the battery main portion 83B, the metal plate 87, the upper casing 91, and the pin 89.

A dotted ellipse in FIG. 33 represents a magnetic flux loop. The power feed coil 30 and the cable 85 are arranged close to each other, and the power feed coil 30 magnetically couples with the cable 85. Accordingly, the foregoing structure serves as the antenna device in which the magnetic flux passes through a loop plane of the foregoing looped current path.

Eighteenth Preferred Embodiment

Figure 34:
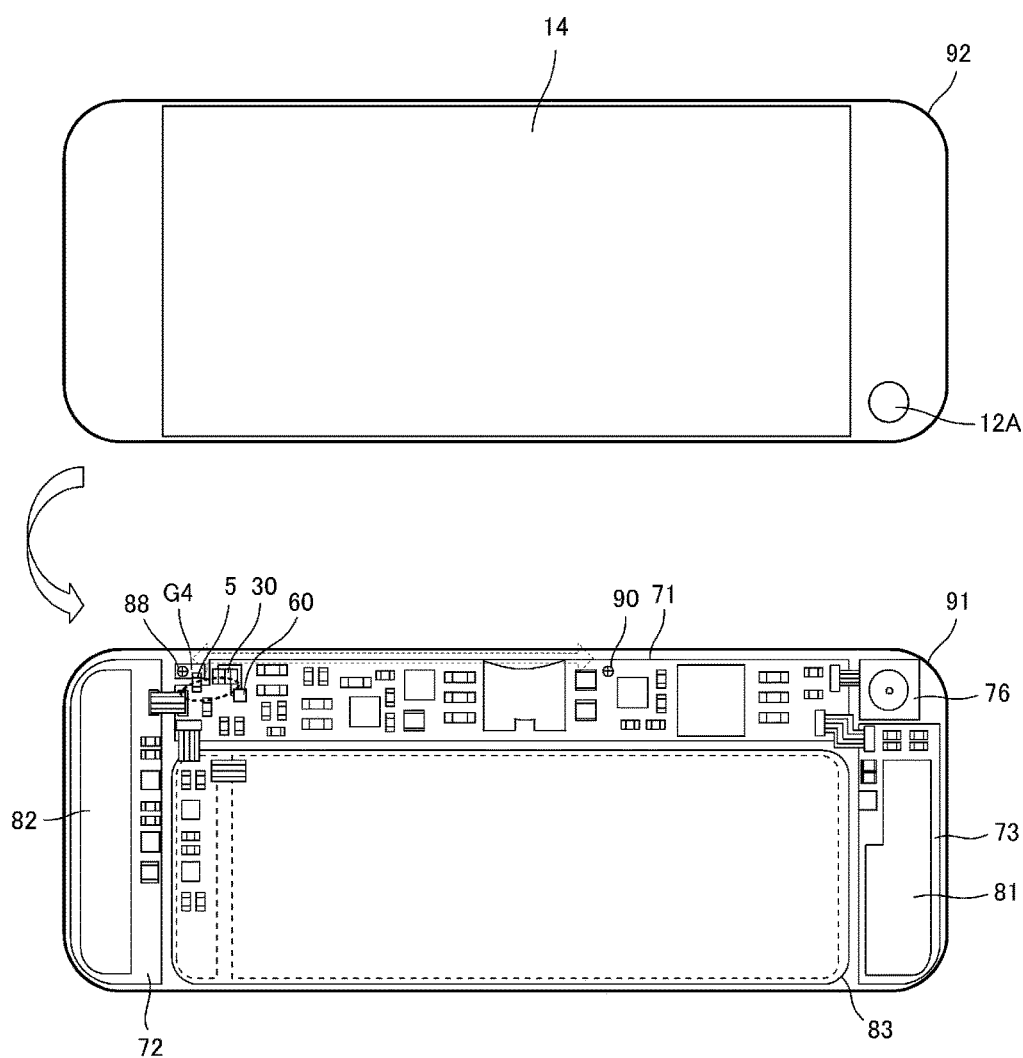
FIG. 34 is a plan view illustrating a structure inside a casing of a communication terminal device according to an eighteenth preferred embodiment of the present invention.

FIG. 34 is a plan view illustrating a structure inside a casing of a communication terminal device according to the eighteenth preferred embodiment of the present invention. Circuit boards 71, 72, and 73, a battery pack 83, and the like are fitted inside a upper casing 91 that is a metal casing. A RFIC 60 including a communication circuit, a power feed coil 30, and the like are mounted on the circuit board 71. UHF band antennas 82, 81 and the like are mounted on the circuit boards 72, 73. A lower casing 92 is made of resin and defines a bottom side of the communication terminal device. An opening 12A is formed in the lower casing 92 at a counterpart position of a camera module. A metal film 14 is provided inside the lower casing 92. However, the metal film 14 does not define a portion of a looped current path.

A chip capacitor 5 is mounted on the circuit board 71 between a ground conductor and an electrode G4. The ground conductor of the circuit board 71 is connected to the upper casing 91 through a pin 90.

In FIG. 34, a looped current path includes the ground conductor of the circuit board 71, the chip capacitor 5, the electrode G4, a screw 88, the upper casing 91, and the screw 90.

A dotted ellipse in FIG. 34 represents a magnetic flux loop. The power feed coil 30 and the chip capacitor 5 are arranged close to each other, and the power feed coil 30 magnetically couples with the chip capacitor 85. Accordingly, the foregoing structure serves as the antenna device in which the magnetic flux passes through a loop plane of the foregoing looped current path.

The foregoing preferred embodiments are for illustrative purposes only, and the present invention is not limited thereto. The power feed coil 30 and the RFIC 60 may be integrated into a single module, for example. The foregoing structure provides electrical continuity between the RFIC and the power feed coil without using wiring of boards such as the circuit boards, and also increases flexibility in designing mounting spaces.

Further, in the foregoing preferred embodiments, the power feed coils including rectangular or substantially rectangular helical coil conductors are used. However, a power feed coil including a spiral conductor pattern may alternatively be used.

Further, the first conductor plane and the second conductor plane according to various preferred embodiments of the present invention are not limited to the cases where one of the first conductor plane and the second conductor plane is the ground conductor or the battery pack on the circuit board, or the cases where one of the first conductor plane and the second conductor plane is the metal portion of the casing. For example, a shield case, a shield plate, a LCD panel, or the like may be used as the first conductor plane or the second conductor plane.

Further, FIG. 1 and the like illustrate the plate-shaped second conductor planes 12. However, the shape of the second conductor plane 12 is not limited thereto, and any shape may be provided as long as the shape allows the second conductor plane 12 to connect with the second connection conductor 22 through the first connection conductor 21 and allows a current to flow along the opening portion between the first conductor plane 11 and the second conductor plane 12. For example, the shape may be a long-and-narrow shape disposed so that a longer direction thereof is parallel or substantially parallel to the opening portion. Alternatively, a wire or a plastic case, on which a conductor is painted by plating such as, for example, a molded interconnect device (MID) or the like, may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device incorporated in electronic equipment, the antenna device comprising:
    a ground conductor provided in a circuit board in the electronic equipment;
    a conductor portion of a casing of the electronic equipment;
    a connection conductor that connects the ground conductor and the conductor portion of the casing;
    a capacitor that defines a looped current path with the ground conductor, the conductor portion of the casing, and the connection conductor; and
    an inductor that defines the looped current path with the ground conductor, the conductor portion of the casing, and the connection conductor, and that is a separate component from the ground conductor, the conductor portion of the casing, and the connection conductor; wherein a resonant circuit is provided that includes the ground conductor, the conductor portion of the casing, the connection conductor, the capacitor, and the inductor;

a resonant frequency of the resonant circuit is in a High Frequency band which is in a carrier frequency band of communication signals or near the carrier frequency band; and the antenna device couples with a counterpart antenna by a magnetic field.

2. The antenna device according to claim 1, wherein the connection conductor is a ground connection pin connecting the ground conductor and the conductor portion of the casing.

3. The antenna device according to claim 1, wherein the resonant circuit resonates in the carrier frequency band of communication signals or near the carrier frequency band by a power feed coil being magnetically coupled with the connection conductor.

4. The antenna device according to claim 2, wherein the resonant circuit resonates in the carrier frequency band of communication signals or near the carrier frequency band by a power feed coil being magnetically coupled with the connection conductor.

* * * * *